(12) United States Patent
Seo et al.

(10) Patent No.: US 12,322,412 B2
(45) Date of Patent: Jun. 3, 2025

(54) METHOD FOR PROVIDING VIDEO AND ELECTRONIC DEVICE SUPPORTING THE SAME

(71) Applicant: Samsung Electronics Co., Ltd., Suwon-si (KR)

(72) Inventors: Donghwan Seo, Suwon-si (KR); Sungoh Kim, Suwon-si (KR); Dasom Lee, Suwon-si (KR); Sanghun Lee, Suwon-si (KR); Sungsoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 192 days.

(21) Appl. No.: 17/953,883

(22) Filed: Sep. 27, 2022

(65) Prior Publication Data
US 2023/0124111 A1 Apr. 20, 2023

Related U.S. Application Data

(63) Continuation of application No. PCT/KR2022/013980, filed on Sep. 19, 2022.

(30) Foreign Application Priority Data

Oct. 1, 2021 (KR) .......................... 10-2021-0131180

(51) Int. Cl.
*G10L 21/00* (2013.01)
*G06V 20/40* (2022.01)
(Continued)

(52) U.S. Cl.
CPC .............. *G10L 25/57* (2013.01); *G06V 20/46* (2022.01); *G10L 21/028* (2013.01)

(58) Field of Classification Search
CPC .......... G06N 20/00; G06N 3/02; G06N 3/006; G06N 3/088; G06N 3/044; G06N 3/047;
(Continued)

(56) References Cited

U.S. PATENT DOCUMENTS

| 11,996,900 B2* | 5/2024 | Cella ..................... G06N 3/044 |
| 2002/0078446 A1* | 6/2002 | Dakss .................. H04N 21/435 |
| | | 375/E7.008 |

(Continued)

FOREIGN PATENT DOCUMENTS

| JP | 2001-242898 A | 9/2001 |
| JP | 2011-027825 A | 2/2011 |

(Continued)

OTHER PUBLICATIONS

Weakly-Supervised Audio-Visual Sound Source Detection, Mar. 25, 2021.

(Continued)

*Primary Examiner* — Michael Ortiz-Sanchez
(74) *Attorney, Agent, or Firm* — Jefferson IP Law, LLP

(57) ABSTRACT

An electronic device is provided. The electronic device includes a memory, and at least one processor electrically connected to the memory, wherein the at least one processor is configured to obtain a video including an image and an audio, obtain information on at least one object included in the image from the image, obtain a visual feature of the at least one object, based on the image and the information on the at least one object, obtain a spectrogram of the audio, obtain an audio feature of the at least one object from the spectrogram of the audio, combine the visual feature and the audio feature, obtain, based on the combined visual feature and audio feature, information on a position of the at least one object the information indicating the position of the at least one object in the image, obtain an audio part corre- (Continued)

sponding to the at least one object in the audio, based on the combined visual feature and audio feature, and store, in the memory, the information on the position of the at least one object and the audio part corresponding to the at least one object.

18 Claims, 11 Drawing Sheets

(51) Int. Cl.
*G10L 21/028* (2013.01)
*G10L 25/00* (2013.01)
*G10L 25/57* (2013.01)

(58) Field of Classification Search
CPC .......... G06N 3/042; G06N 3/08; G06N 3/048; G06V 10/82; G06V 10/20; G06V 20/00; G06V 20/40; G06V 20/46; G06V 20/52; G06V 20/50; G06V 10/7715; G06V 10/764; G06V 10/70; G10L 21/028; G10L 25/18; G10L 25/30; G10L 25/57; G06T 2207/20081; G06T 2207/20084; G06T 2207/10016
See application file for complete search history.

(56) References Cited

U.S. PATENT DOCUMENTS

| | | |
|---|---|---|
| 2009/0097670 A1 | 4/2009 | Jeong et al. |
| 2011/0022361 A1 | 1/2011 | Sekiya et al. |
| 2012/0099732 A1 | 4/2012 | Msser |
| 2012/0128165 A1 | 5/2012 | Visser et al. |
| 2012/0316869 A1 | 12/2012 | Xiang et al. |
| 2013/0141439 A1 | 6/2013 | Kryzhanovsky et al. |
| 2014/0314391 A1 | 10/2014 | Kim et al. |
| 2016/0054895 A1 | 2/2016 | Lee et al. |
| 2016/0071526 A1 | 3/2016 | Wingate et al. |
| 2016/0180865 A1 | 6/2016 | Citerin et al. |
| 2017/0265016 A1 | 9/2017 | Oh et al. |
| 2018/0047407 A1 | 2/2018 | Mitsufuji |
| 2019/0222798 A1 | 7/2019 | Honma et al. |
| 2019/0253828 A1 | 8/2019 | Honma et al. |
| 2020/0143838 A1* | 5/2020 | Peleg .................. G06F 18/2413 |
| 2020/0288256 A1 | 9/2020 | Jung et al. |
| 2021/0096810 A1 | 4/2021 | Kim et al. |
| 2021/0174817 A1* | 6/2021 | Grauman ................ G10L 25/51 |
| 2021/0201933 A1 | 7/2021 | Kang |
| 2021/0319321 A1* | 10/2021 | Krishnamurthy ...... G06N 20/00 |
| 2021/0350135 A1* | 11/2021 | Salamon ................ H04S 7/302 |

FOREIGN PATENT DOCUMENTS

| | | |
|---|---|---|
| JP | 2013-545137 A | 12/2013 |
| KR | 10-2009-0037692 A | 4/2009 |
| KR | 10-2013-0084298 A | 7/2013 |
| KR | 10-1373020 B1 | 3/2014 |
| KR | 10-2019-0118994 A | 10/2019 |
| KR | 10-2020-0020590 A | 2/2020 |
| KR | 10-2020-0054344 A | 5/2020 |
| KR | 10-2021-0022600 A | 3/2021 |
| KR | 10-2021-0043958 A | 4/2021 |
| WO | 2017/208821 A1 | 12/2017 |

OTHER PUBLICATIONS

International Search Report dated Dec. 23, 2022, issued in International Patent Application No. PCT/KR2022/013980.
Relja et al., Objects that Sound, Jul. 25, 2018.
Ariel et al., Looking to listen at the cocktail party: A speaker-independent audio-visual model for speech separation, Aug. 2018.

\* cited by examiner

METHOD FOR PROVIDING VIDEO AND ELECTRONIC DEVICE SUPPORTING THE SAME

CROSS-REFERENCE TO RELATED APPLICATION(S)

This application is a continuation application, claiming priority under § 365(c), of an International application No. PCT/KR2022/013980, filed on Sep. 19, 2022, which is based on and claims the benefit of a Korean patent application number 10-2021-0131180, filed on Oct. 1, 2021, in the Korean Intellectual Property Office, the disclosure of which is incorporated by reference herein in its entirety.

TECHNICAL FIELD

The disclosure relates to a method for providing videos and an electronic device supporting the same.

BACKGROUND ART

The cocktail party effect refers to the ability to selectively focus on and perceive speech from a specific person in a noisy environment.

There has recently been ongoing research for implementing the cocktail party effect in electronic devices. For example, there has been ongoing research regarding a technology wherein, while an electronic device outputs videos including images and audios regarding objects, an object selected by a user inside an image is displayed differently from other image parts, and an audio corresponding to the selected object is output.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

When a video includes multiple objects, and when multiple audios of multiple objects exist, an electronic device may have difficulty in identifying the multiple audios corresponding to the multiple objects, respectively. For example, when there are multiple objects displayed and multiple audios output by an electronic device in a specific section of a video, the electronic device may have difficulty in identifying to which audio among the multiple audios each of the multiple objects corresponds.

In addition, the electronic device may have difficulty in identifying the exact position of an object corresponding to an audio inside the video, and when multiple audios are output, it may be difficult to accurately separate an audio corresponding to an object selected by the user from the multiple audios.

Aspects of the disclosure are to address at least the above-mentioned problems and/or disadvantages and to provide at least the advantages described below. Accordingly, an aspect of the disclosure is to provide a method for providing images and an electronic device supporting the same, wherein information regarding the position of objects and audios corresponding to the objects are acquired from a video with regard to each object.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a memory and at least one processor electrically connected to the memory, wherein the at least one processor is configured to obtain a video including an image and an audio, obtain information on at least one object included in the image from the image, obtain a visual feature of the at least one object, based on the image and the information on the at least one object, obtain a spectrogram of the audio, obtain an audio feature of the at least one object from the spectrogram of the audio, combine the visual feature and the audio feature, obtain, based on the combined visual feature and audio feature, information on a position of the at least one object, the information indicating the position of the at least one object in the image, obtain an audio part corresponding to the at least one object in the audio, based on the combined visual feature and audio feature, and store, in the memory, the information on the position of the at least one object and the audio part corresponding to the at least one object.

In accordance with another aspect of the disclosure, a method for providing a video by an electronic device is provided. The method includes obtaining a video including an image and an audio, obtaining information on at least one object included in the image from the image, obtaining a visual feature of the at least one object, based on the image and the information on the at least one object, obtaining a spectrogram of the audio, obtaining an audio feature of the at least one object from the spectrogram of the audio, combining the visual feature and the audio feature, obtaining, based on the combined visual feature and audio feature, information on a position of the at least one object, the information indicating the position of the at least one object in the image, obtaining an audio part corresponding to the at least one object in the audio, based on the combined visual feature and audio feature, and storing, in a memory of the electronic device, the information on the position of the at least one object and the audio part corresponding to the at least one object.

Advantageous Effects

A method for providing videos and an electronic device supporting the same, according to various embodiments of the disclosure, may acquire information regarding the position of objects and audios corresponding to the objects from a video with regard to each object. Various other advantageous effects identified explicitly or implicitly through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
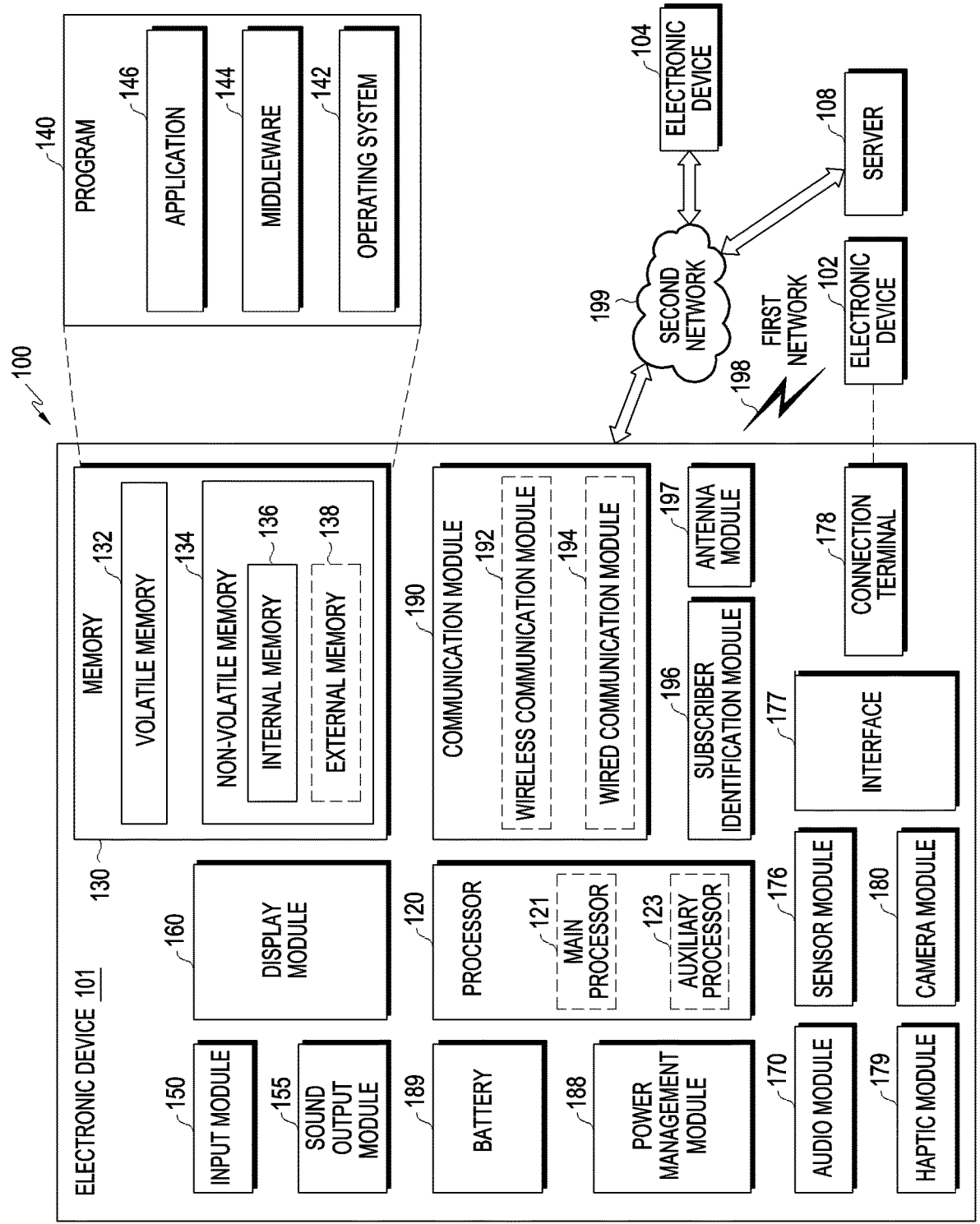
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
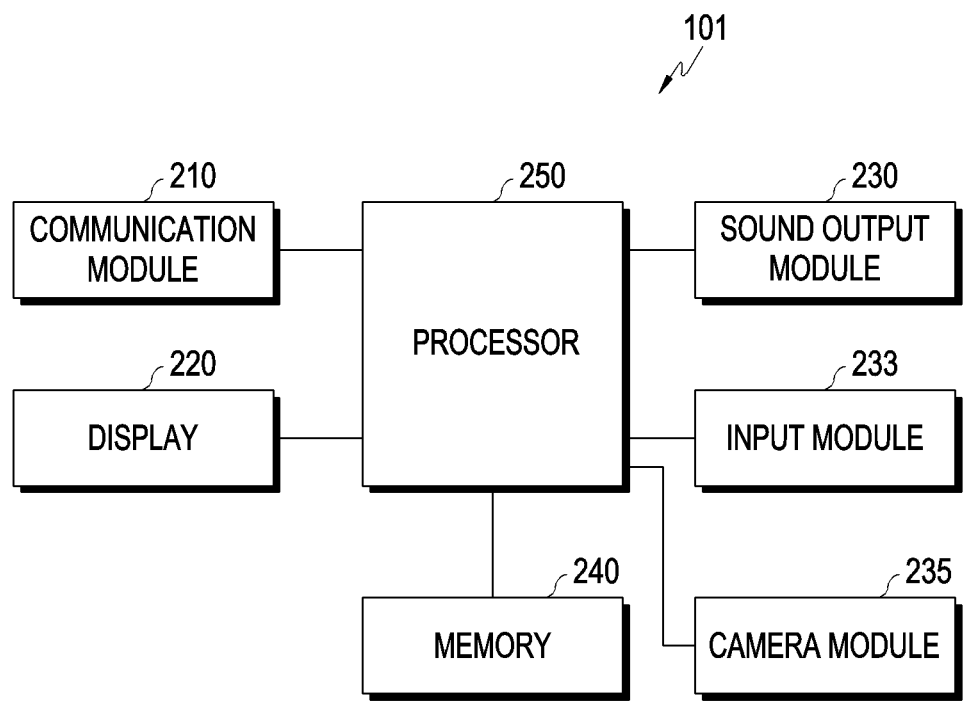
FIG. 2 is a block diagram of an electronic device according to an embodiment of the disclosure.

FIG. 2 is a block diagram of the electronic device according to an embodiment of the disclosure.

Referring to FIG. 2, in an embodiment of the disclosure, the electronic device 101 may include a communication module 210, a display 220, a sound output module 230, an input module 233, a camera module 235, a memory 240, and/or a processor 250, and may implement various embodiments disclosed herein, even though at least some of the illustrated elements and/or functions are omitted or replaced. In an embodiment of the disclosure, the electronic device 101 may further include at least some of the elements and/or functions of the electronic device 101 in FIG. 1. At least some (e.g., the communication module 210, the memory 240, and the processor 250) of the elements of an electronic device 200 may be arranged in a housing (not illustrated), and at least some (e.g., the display 220, the sound output module 230, the input module 233, and the camera module 235) thereof may be visually exposed to the outside. At least some of the elements of the electronic device 101 may be operatively, electrically, and/or functionally connected to each other.

In an embodiment of the disclosure, the communication module 210 may be included in the communication module 190 shown in FIG. 1. According to an embodiment of the disclosure, the communication module 210 may include a software and/or hardware module for wireless communication with a cellular network, and may include at least some of the elements and/or functions of the wireless communication module 192 in FIG. 1.

In an embodiment of the disclosure, the communication module 210 may transmit and/or receive a video to or from the external electronic device 101 (e.g., the electronic device 102, the electronic device 104, and/or the server 108).

In an embodiment of the disclosure, when a part of an operation of providing a video is performed by the electronic device 101, and another part of the operation providing the video is performed a server (e.g., the server 108), the communication module 210 may transmit, to the server, information on a result obtained by the part of the operation of providing the video, performed by the electronic device 101, and receive, from the server, a result obtained by said another part of the operation of providing the video, performed by the server.

In an embodiment of the disclosure, the display 220 may be included in the display module 160 shown in FIG. 1. In an embodiment of the disclosure, the display 220 may display a video signal provided from the processor 250. The display 220 may be implemented as a flexible display, a foldable display, or a slidable display. In addition, the display 220 may be implemented as one of a liquid crystal display (LCD), a light-emitting diode (LED) display, an organic light-emitting diode (OLED) display, a quantum dot light-emitting diode (QLED) display, a micro electro mechanical system (MEMS) display, an electrophoretic display, or an electronic paper display. However, the disclosure is not limited thereto.

In an embodiment of the disclosure, the display 220 may output an image included in a video.

In an embodiment of the disclosure, while a video is output, the display 220 may display an object included in an image (an image frame) of the video and corresponding to an audio (also called "a sound source") being output by the electronic device 101 such that the object is distinguished from another object included in the image. In an embodiment of the disclosure, while a video is output, the display 220 may display visual information indicating a time interval for which an audio included in an image of the video and being output by the electronic device 101, and/or a size (e.g., the amplitude or volume of the audio) of the audio.

In an embodiment of the disclosure, the sound output module 230 (e.g., a speaker) may be included in the sound output module 155 shown in FIG. 1. According to an embodiment of the disclosure, the sound output module 230 may output an audio (e.g., a sound source) to the outside of the electronic device 101. One or more speakers may be arranged at an upper end or lower end of a housing of the electronic device 101, and the arrangement positions are not limited thereto. For example, the speaker may include at least some of the elements and/or functions of the audio module 170 in FIG. 1.

In an embodiment of the disclosure, the sound output module 230 may include, as the sound output module 230, a receiver or a speaker, such as a dynamic driver, a balanced armature driver, and/or a piezoelectric speaker). In an embodiment of the disclosure, when the electronic device 101 includes multiple speakers, the processor 250 may output an audio signal having multiple different channels (e.g., stereo or 5.1 channels) through at least some speakers among the multiple speakers. In another embodiment of the disclosure, the electronic device 101 may be connected to an external electronic device (e.g., an external speaker or headset) directly through a connection terminal, or wirelessly via a wireless communication module (e.g., the wireless communication module 192 in FIG. 1), so as to output an audio signal.

In an embodiment of the disclosure, the sound output module 230 may output an audio included in a video.

In an embodiment of the disclosure, while a video is output, the sound output module 230 may increase the size of an audio corresponding to an object designated by a user in an image of the video.

In an embodiment of the disclosure, while a video is output, when an image of the video includes multiple objects, and multiple audios corresponding to the multiple objects are being output, the sound output module 230 may increase the size of an audio corresponding to an object designated by a user among the multiple objects, and reduce the sizes of audios corresponding to the remaining objects.

In an embodiment of the disclosure, while a video is output, when an image of the video includes multiple objects, and multiple audios corresponding to the multiple objects are being output, the sound output module 230 may output an audio corresponding to an object designated by a user among the multiple objects, and not output audios corresponding to the remaining objects.

In an embodiment of the disclosure, the input module 233 may be included in the input module 150 shown in FIG. 1. According to an embodiment of the disclosure, the electronic device 101 may obtain an audio signal. According to various embodiments of the disclosure, when an image (e.g., video) is captured, the electronic device 101 may obtain an audio signal corresponding to a background sound of the video. The electronic device 101 may receive an input of an external voice by using the input module 233 (e.g., a microphone) included in the electronic device 101, and generate an audio signal.

According to an embodiment of the disclosure, the electronic device 101 may receive an audio signal from an external electronic device (e.g., the electronic device 102 or 104 and/or the server 108 in FIG. 1) connected thereto. For example, the external electronic device may generate an audio signal by using a collected voice, and transmit the generated audio signal to the electronic device 101. The electronic device 101 may receive an audio signal from the external electronic device. According to an embodiment of the disclosure, the electronic device 101 may simultaneously capture an image (or video) and receive an audio signal of a voice corresponding to the image (or video) from the external electronic device.

According to an embodiment of the disclosure, in the input module 233, multiple microphones may be arranged to sense the direction of an audio (e.g., sound). For example, multiple microphones included in the electronic device 101 may perform a beamforming operation required to improve directivity in a process of obtaining an audio signal. In an embodiment of the disclosure, the beamforming operation may be implemented by a minimum variance distortionless response (MVDR) or a generalized sidelobe canceller (GSC).

In an embodiment of the disclosure, the camera module 235 may capture a video of various subjects. For example, the subject may be a person, a device, or an object. The electronic device 101 may film a subject to generate an image of the filmed subject. In an embodiment of the disclosure, the electronic device 101 may display, on the display 220, a captured image or an image being captured. According to an embodiment of the disclosure, the camera module 235 may include a depth camera (e.g., a $3^{rd}$ dimensional (3D) depth camera, or a time of flight (TOF) camera) capable of measuring a distance.

In an embodiment of the disclosure, multiple camera modules may be used to obtain individual images. For example, a first camera module may obtain a first image (e.g., a first image 410 in FIG. 4), and a second camera module may obtain a second image (e.g., a second image 420 in FIG. 4). For example, the first camera module and the second camera module may provide different fields of views (FOVs).

In an embodiment of the disclosure, the memory 240 may be included in the memory 130 in FIG. 1, and may store at least a part of the program 140 in FIG. 1. According to an embodiment of the disclosure, the memory 240 may include a known volatile memory and a non-volatile memory. The memory 240 may store various instructions executable via the processor 250. Such instructions may include control commands, such as arithmetic and logical operations, data transfer, or input/output which can be recognized by the processor 250. In an embodiment of the disclosure, the memory 240 may store information for performing at least a part of an operation of providing a video. The information, stored in the memory 240, for performing at least a part of the operation of providing the video will be described later.

In an embodiment of the disclosure, the processor 250 may be an element capable of performing calculation or data processing related to control and/or communication of each element of the electronic device 101, and may be included in the processor 120 in FIG. 1. In an embodiment of the disclosure, the processor 250 may be operatively, electrically, and/or functionally connected to the communication module 210, the display 220, the sound output module 230, the memory 240, the input module 233, and/or the camera module 235, and an internal element of the electronic device 101.

In an embodiment of the disclosure, the processor 250 may control an overall operation of providing a video. In an embodiment of the disclosure, the processor 250 may include one or more processors for performing an operation of providing a video.

In an embodiment of the disclosure, the processor 250 may perform training to generate an artificial intelligence model used in an operation of providing a video as well as performing the operation of providing a video. The training and the operation of providing a video, which are performed by the processor 250, will be described with reference to FIG. 3 and below. According to various embodiments of the disclosure, there is no limit to calculation and data processing functions which can be implemented in the electronic device 101 by the processor 250, and an operation of the processor 250 described later may be performed by execution of instructions stored in the memory 240. In an embodiment of the disclosure, FIG. 2 illustrates an example that the electronic device 101 includes the communication module 210, the display 220, the sound output module 230, the input module 233, the camera module 235, the memory 240, and/or the processor 250, but the disclosure is not limited thereto. For example, the electronic device 101 may, according to an embodiment of the disclosure, not include at least one of the communication module 210, the display 220, the sound output module 230, the input module 233, or the camera module 235. As another example, the electronic device 101 may, according to an embodiment of the disclosure, further include at least one element (e.g., the sensor module 176) among the elements of the electronic device 101 illustrated in FIG. 1.

Figure 3:
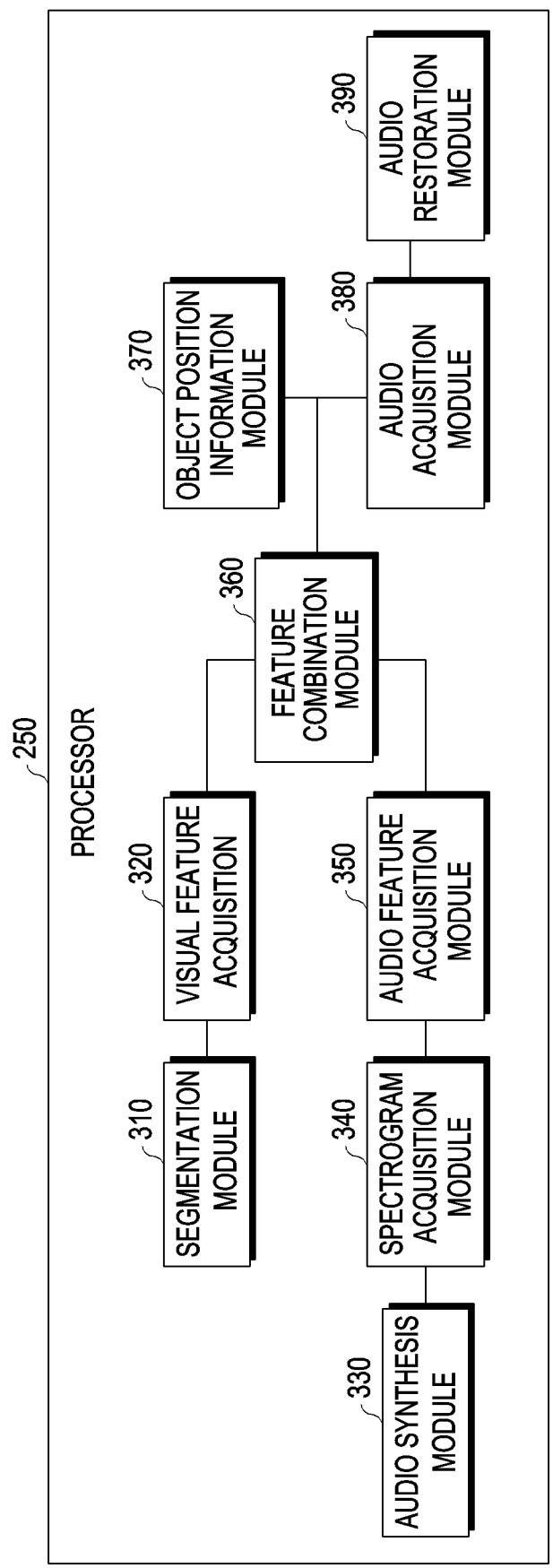
FIG. 3 is a block diagram of a processor according to an embodiment of the disclosure.

FIG. 3 is a block diagram of a processor according to an embodiment of the disclosure.

Figure 4:
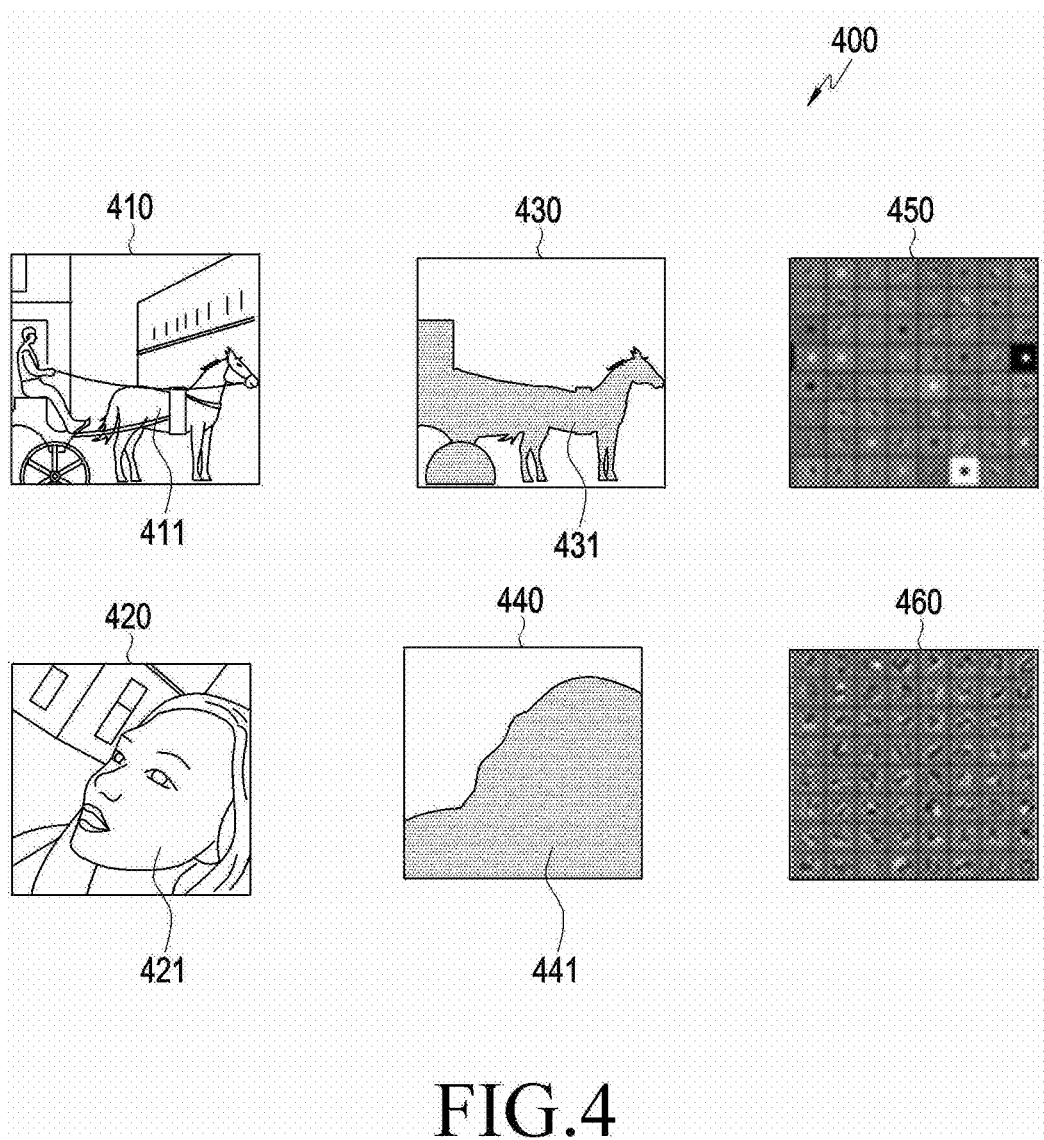
FIG. 4 is a diagram illustrating an operation of obtaining a visual feature of each object from a video according to an embodiment of the disclosure.

FIG. 4 is a diagram 400 illustrating an operation of obtaining a visual feature of each object from a video according to an embodiment of the disclosure.

Figure 5:
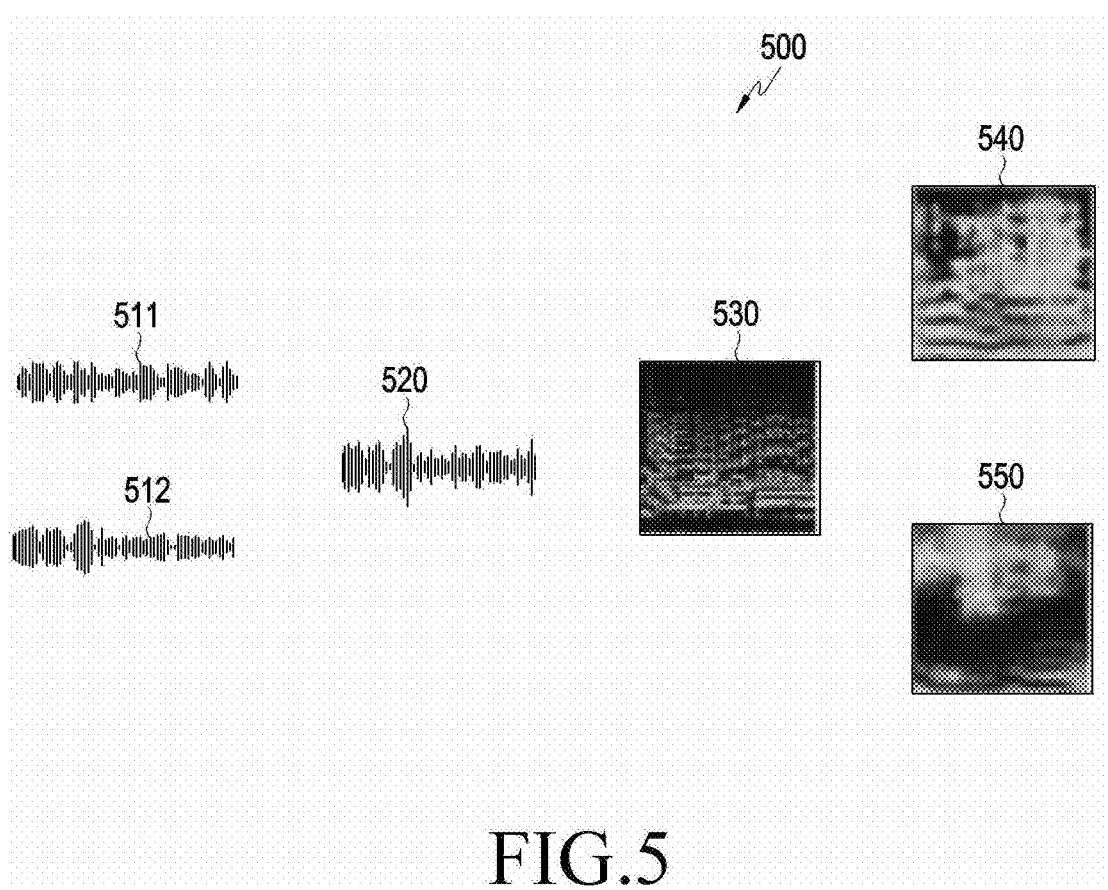
FIG. 5 is a diagram illustrating an operation of obtaining an audio feature of each object from a video according to an embodiment of the disclosure.

FIG. 5 is a diagram 500 illustrating an operation of obtaining an audio feature of each object from a video according to an embodiment of the disclosure.

Figure 6:
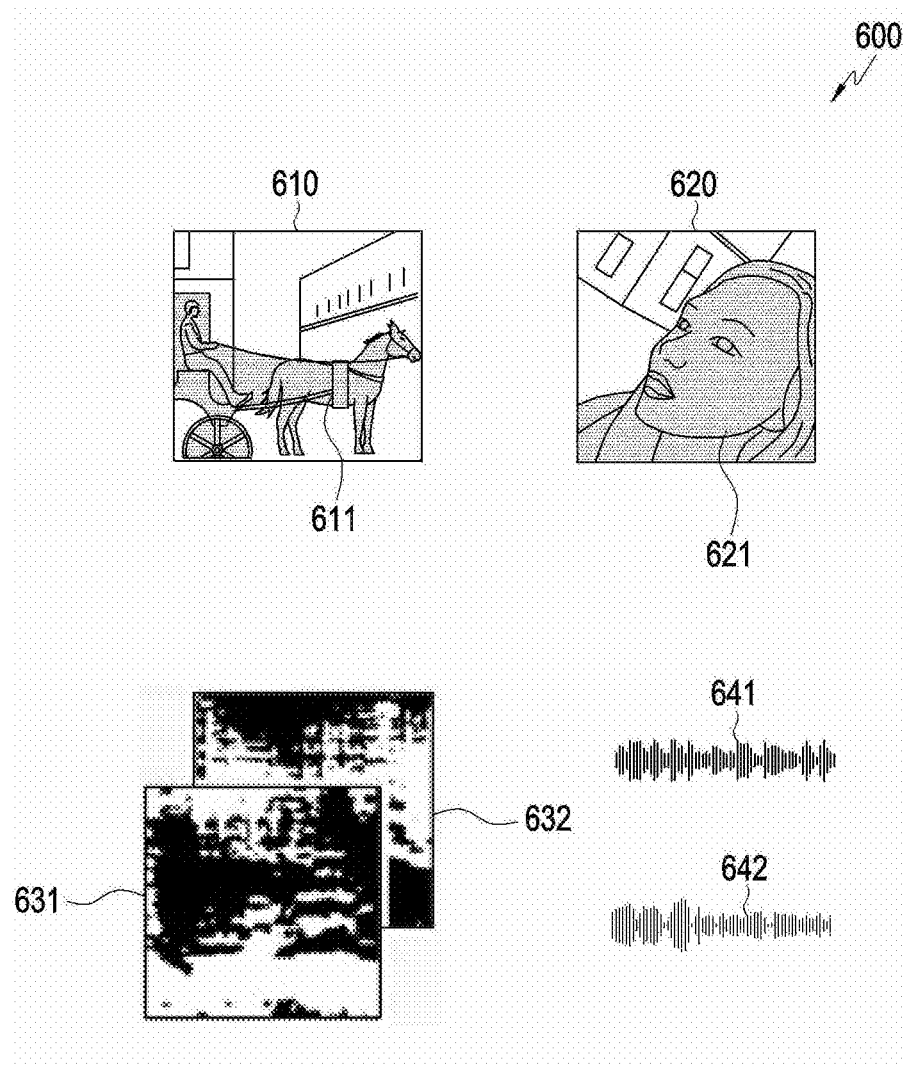
FIG. 6 is a diagram illustrating an operation of obtaining an audio and information on a position of an object in an image according to an embodiment of the disclosure.

FIG. 6 is a diagram 600 illustrating an operation of obtaining an audio and information on the position of an object in an image according to an embodiment of the disclosure.

Figure 7:
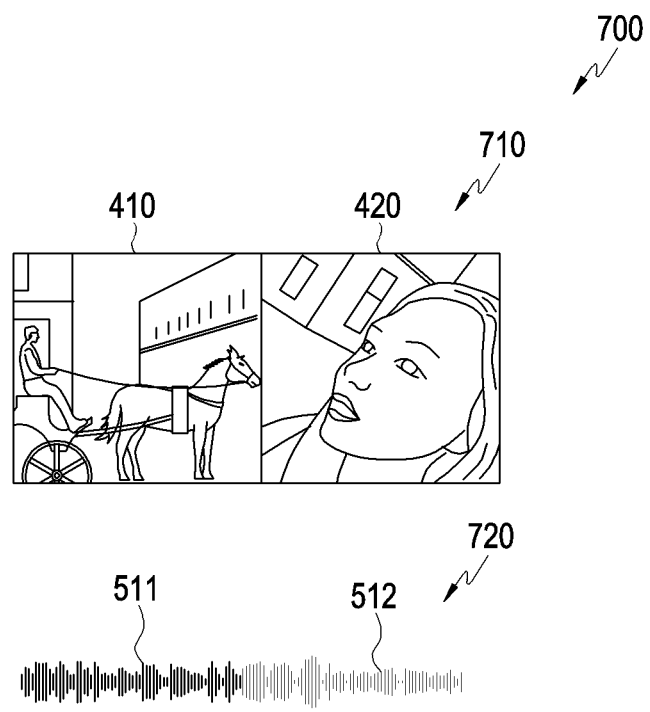
FIG. 7 is a diagram illustrating training data according to an embodiment of the disclosure.

FIG. 7 is a diagram 700 illustrating training data according to an embodiment of the disclosure.

Referring to FIGS. 3, 4, 5, 6, and 7, in an embodiment of the disclosure, the processor 250 may include multiple elements to perform an operation of providing a video, and perform training to generate an artificial intelligence model used in the operation of providing a video. For example, the processor 250 may include a segmentation module 310, a visual feature acquisition module 320, an audio synthesis module 330, a spectrogram acquisition module 340, an audio feature acquisition module 350, a feature combination module 360, an object position information acquisition module 370, an audio acquisition module 380, and/or an audio restoration module 390.

In an embodiment of the disclosure, the segmentation module 310 may obtain, from an image (e.g., an image frame) included in a video, information (hereinafter, referred to as "information on an object") on an object included in the image. For example, the segmentation module 310 may obtain a map (e.g., a binary map in which at a pixel value indicating at least one object included in an image is "1", and a pixel value of a part remaining after excluding the at least one object from the image is "0") in which at least one object included in an image is masked.

In an embodiment of the disclosure, the segmentation module 310 may include a segmentation artificial intelligence network. In an embodiment of the disclosure, the segmentation artificial intelligence network may include a panoptic segmentation network or an instance segmentation network. For example, the panoptic segmentation network may combine a semantic segmentation network and an instance segmentation network together, and may be used to generate an all-in-one model. In an embodiment of the disclosure, an external electronic device (e.g., an external electronic device (e.g., the electronic device 102 or 104 and/or the server 108 in FIG. 1) may obtain an efficient all-in-one model which is executable in relation to a high-resolution image in an environment (e.g., a mobile electronic device) operating in limited memory and computing resources.

In an embodiment of the disclosure, the segmentation module 310 may perform training by using multiple videos.

In an embodiment of the disclosure, the segmentation module 310 may obtain multiple images from multiple videos each including an object in order to perform training. For example, the segmentation module 310 may obtain the first image 410 from a first video and the second image 420 from a second video as illustrated in FIG. 4. The first image 410 and the second image 420 may include a first object 411 (e.g., an image part related to a carriage) and a second object 421 (e.g., an image part related to a person), respectively. FIG. 4 illustrates an example that the segmentation module 310 obtains the first image 410 from the first video and obtains the second image 420 from the second video, but the disclosure is not limited thereto. For example, the segmentation module 310 may obtain three or more images from three or more videos, respectively.

In an embodiment of the disclosure, the segmentation module 310 may generate an artificial intelligence model (e.g., a parameter of a segmentation artificial intelligence network) related to a segmentation artificial intelligence network by using multiple images obtained from multiple videos, and a ground truth (or annotation) (e.g., an image part of the at least one object in each of the images of the multiple videos). According to an embodiment of the disclosure, each pixel in an obtained image frame may be labeled, and a difference between a label of pixels and a ground truth label may be used. For example, a difference between the entropy of a first pixel and the entropy of an adjacent pixel pair may be used. In an embodiment of the disclosure, a ground truth label is real label data of each pixel which is desired to be derived using a deep neural network-based model, and may be a criterion of assessment of the accuracy of a pixel labeled by the deep neural network-based model.

In an embodiment of the disclosure, when the first image 410 and the second image 420 are input, the segmentation module 310 may, as illustrated in FIG. 4, obtain a first masking map 430 including a mask 431 for the first object 411, and a second masking map 440 including a mask 441 for the second object 421.

In an embodiment of the disclosure, the visual feature acquisition module 320 may obtain a visual feature of an object from an image included in a video, and information on the object. For example, the visual feature acquisition module 320 may obtain a visual feature (also referred to as a "visual feature map") corresponding to each of at least one object, based on an image included in a video, and information on the object.

In an embodiment of the disclosure, while training is performed, the visual feature acquisition module 320 may obtain a first visual feature map 450 and a second visual feature map 460 for the objects 411 and 421, based on the first image 410, the second image 420, the first masking map 430, and the second masking map 440. The first visual feature map 450 may be a visual feature map corresponding to the first object 411, and the second visual feature map 460 may be a visual feature map corresponding to the second object 421.

In an embodiment of the disclosure, the visual feature acquisition module 320 may include a visual artificial intelligence network. In an embodiment of the disclosure, the visual artificial intelligence network may be implemented as a convolutional neural network (CNN) (e.g., a residual network (ResNet), visual geometry group network (VGG-Net), Inception (GoogleNet), Xception, LeNet, AlexNet, or ZFNet). For example, the electronic device 101 may input an input image and a reconfigured image to a pre-configured artificial neural network model so as to extract an input image feature from the input image, and extract a reconfigured image feature from the reconfigured image.

In an embodiment of the disclosure, the audio synthesis module 330 may synthesize multiple audios obtained from multiple videos, which are obtained to perform training. In an embodiment of the disclosure, in FIGS. 4 and 5, the audio synthesis module 330 may obtain a first audio 511 to be output for a time interval of the first image 410 in the first video, and a second audio 512 to be output for a time interval of the second image 420 in the second video. For example, when the frame per second (FPS) of the first video and the second video is 24 FPS, a time interval of the first audio 511 to be output together with each of the first image 410 in the first video, and a time interval of the second audio 512 to be output together with the second image 420 in the second video may be 1/24 (seconds). In an embodiment of the disclosure, in FIG. 5, the audio synthesis module 330 may synthesize the first audio 511 and the second audio 512 to obtain a synthesized audio 520. In an embodiment of the disclosure, the audio synthesis module 330 may sum up a size of the first audio 511 and a size of the second audio 512 according to time, and obtain the synthesized audio 520 as a result of the summing.

In an embodiment of the disclosure, the audio synthesis module 330 may operate for training of an artificial intelligence model, and may not operate while the electronic device 101 performs a real operation (e.g., operations described later as an example with reference to FIG. 9).

In an embodiment of the disclosure, the spectrogram acquisition module 340 may obtain a spectrogram of an audio included in a video. For example, the spectrogram acquisition module 340 may apply an audio included in a video to a short-time Fourier transform (STFT) so as to obtain a spectrogram visually representing a size (e.g., the amplitude of the audio) of the audio according to each time and frequency with respect to the audio. For example, a time axis is transversely disposed, a frequency axis is longitudinally disposed, and an amplitude difference of an audio (or energy) according to change on the time and frequency axes is represented by depth. A bright color part of a spectrogram 530 may imply that there is audio (or energy), and a dark color part may imply that there is no audio (or energy).

In an embodiment of the disclosure, while training is performed, the spectrogram acquisition module 340 may obtain a spectrogram of a synthesized audio of audios corresponding to objects included in videos, respectively. For example, in FIG. 5, the spectrogram acquisition module 340 may apply the synthesized audio 520 to an STFT, thereby obtaining the spectrogram 530.

In an embodiment of the disclosure, the processor 250 may estimate an echo component (or signal) in the synthesized audio 520. For example, an acoustic echo canceller (AEC) may be included, and may be implemented by various types of adaptive filters (or filter algorithms) for echo removal. In an embodiment of the disclosure, the AEC may apply a normalized least mean-square (NLMS) filter to a reference signal (e.g., a speaker signal) to identify an echo path and synthesize an estimated echo value. In an embodiment of the disclosure, the processor 250 may fail to completely remove an echo component from a microphone signal, and thus a residue echo signal may be included. The residue echo signal may be estimated as a component remaining after removing an estimated echo signal from a real echo signal input from the input module 223 (e.g., a microphone).

In an embodiment of the disclosure, the audio feature acquisition module 350 may obtain an audio feature of an object included in an image from the spectrogram 530 of an audio included in a video. For example, the audio feature acquisition module 350 may obtain an audio feature (also referred to as an "audio feature map") corresponding to each of at least one object included in an image, based on the spectrogram 530 of an audio included in a video.

In an embodiment of the disclosure, while training is performed, the audio feature acquisition module 350 may obtain audio features of objects included in images, based on a synthesized audio (e.g., the synthesized audio 520), respectively. For example, in FIG. 5, the audio feature acquisition module 350 may obtain a first audio feature 540 of the first object 411 and a second audio feature 550 of the second object 421, based on the synthesized audio 520.

In an embodiment of the disclosure, the feature combination module 360 may combine a visual feature transferred from the visual feature acquisition module 320, and an audio feature transferred from the audio feature acquisition module 350. For example, the feature combination module 360 may perform an add operation, a multiplication operation (e.g., matrix multiplication operation), or a concatenation operation for a visual feature and an audio feature, thereby combining the visual feature and the audio feature (hereinafter, a feature obtained by combining a visual feature and an audio feature is called a "combined feature"). In an embodiment of the disclosure, concatenation may indicate an operation of connecting an end of data with an end of another data. For example, a value obtained by connecting an end of a reference block with an end of a target block may be input to a visual artificial intelligence network. For example, the blocks may be finally concatenated in and output from a visual artificial intelligence network (e.g., CNN) configured by multiple parallel layers.

In an embodiment of the disclosure, the feature combination module 360 may combine, for each object, a visual feature and an audio feature corresponding to the object. In an embodiment of the disclosure, in FIGS. 4 and 5, while training is performed, the visual feature acquisition module 320 and the audio feature acquisition module 350 may be configured to, in the order of the first object 411 and the second object 421, obtain the first visual feature 450 and the second visual feature 460 and obtain the first audio feature 540 and the second audio feature 550. While training is performed, the feature combination module 360 may combine the first visual feature 450 and the first audio feature 540 corresponding to the first object 411, and combine the second visual feature 460 and the second audio feature 550 corresponding to the second object 421.

In an embodiment of the disclosure, a size of a visual feature transferred from the visual feature acquisition module 320, and a size of an audio feature transferred from the audio feature acquisition module 350 may be substantially the same. For example, when a size of a visual feature (e.g., a visual feature map) is 24*24 (24 pixels in the transverse direction and 24 pixels in the longitudinal direction), a size of an audio feature (e.g., an audio feature map) may be also 24*24. In an embodiment of the disclosure, when a visual feature and an audio feature corresponding to an object are combined, a size (e.g., 24*24) of a feature obtained by combining the visual feature and the audio feature may be the same as a size (e.g., 24*24) of the visual feature and a size (e.g., 24*24) of the audio feature.

In an embodiment of the disclosure, the feature combination module 360 may transfer, to the object position information acquisition module 370 and the audio acquisition module 380, combined features (e.g., a first combined feature obtained by combining the first visual feature 450 and the first audio feature 540, and a second combined feature obtained by combining the second visual feature 460 and the second audio feature 550).

In an embodiment of the disclosure, the object position information acquisition module 370 may obtain, based on a combined feature and for each object, information indicating the position of the object in an image of a video. For example, the object position information acquisition module 370 may obtain, for each object, an image (also called "a segmentation map" or an object localization mask") having a value (or a value obtained by converting, into a binary value (e.g., "0" or "1"), a value of possibility that each pixel represents the object) of possibility that each pixel represents the object. For example, an object localization mask (or a segmentation map) may extract even an exact boundary line of an object from an image to divide a video into significant areas, so as to divide the image into similar areas in view of a meaning or cognitive aspect. For example, when an object (e.g., the first object 411 and the second object 421) and a background of an image are distinguished from each other, an object localization mask may mark a pixel area corresponding to the object with "1", and mark the remaining background area with "0", and then a model may cover a part marked with 1 with a gray mask, and cover a part marked with 0 with a white mask, so that the object and the background can be clearly distinguished in the image.

In an embodiment of the disclosure, while training is performed, the object position information acquisition module 370 may obtain, based on a combined feature and for each object, an image having a value of possibility that each pixel represents the object. For example, in FIG. 6, based on combined features (e.g., the first combined feature obtained by combining the first visual feature 450 and the first audio feature 540, and the second combined feature obtained by combining the second visual feature 460 and the second audio feature 550), the object position information acquisition module 370 may obtain a first object localization mask 610 for the first object 411 (e.g., an image having a binary value of "1" for a set 611 of pixels representing the first object 411, and having a binary value of "0" for pixels other than the set 611 of pixels representing the first object 411) and a second object localization mask 620 for the second object 421 (e.g., an image having a binary value of "1" for a set 621 of pixels representing the second object 421, and having a binary value of "0" for pixels other than the set 621 of pixels representing the second object 421). In an embodiment of the disclosure, the object position information acquisition module 370 may perform an operation of correcting an error, based on a distance (e.g., a Euclidean distance) between a visual feature and an audio feature. In another embodiment of the disclosure, the object position information acquisition module 370 may use a vector similarity between features (a visual feature and an audio feature) in a distance metric method. For example, the object position information acquisition module 370 may perform calculation by using a cosine similarity between vectors, a Mahalanobis distance, or a weighted Euclidean distance, but the disclosure is not limited thereto. In an embodiment of the disclosure, the object position information acquisition module 370 may perform an operation of correcting an error so as to minimize a distance between a visual feature and an audio feature of each object by using a metric learning-based loss function (e.g., a contrastive loss function). For example, the object position information acquisition module 370 may use a contrastive loss function to perform an operation of correcting an error so that a distance between the first visual feature 450 and the first audio feature 540 of the first object 411 is minimized, and a distance between the second visual feature 460 and the second audio feature 550 of the second object 421 is minimized. In an embodiment of the disclosure, a loss function may include a parameter which is pre-trained to minimize a loss (error) between a real input video and a generated object localization mask (or segmentation map). For example, the loss may include a reconstruction loss together with a contrastive loss between the real input video and the generated object localization mask.

In an embodiment of the disclosure, after or during an operation of correcting an error, the object position information acquisition module 370 may obtain, for each object, an image having a value of possibility that each pixel represents the object, by using a designated activation function (e.g., a softmax function). For example, a softmax function among designated activation functions may maximally maintain a possibility to select a solution which is currently considered to be optimal, and assign a weight value to the remaining solutions according to an estimated value so as to adjust a selection possibility. In an embodiment of the disclosure, the object position information acquisition module 370 may perform operations described above for training, and then further perform an operation of correcting an error by using information (e.g., a map in which an object included in an image is masked) on an object transferred from the segmentation module 310.

In an embodiment of the disclosure, the audio acquisition module 380 may obtain, based on a combined feature and for each object, an image (also called an "audio mask" or a "spectrogram binary map") having a value (or a value obtained by converting, into a binary value (e.g., "0" or "1"), a value of possibility that each pixel represents an audio corresponding to the object) of possibility that each pixel represents an audio corresponding to the object in a spectrogram for audio.

In an embodiment of the disclosure, while training is performed, the audio acquisition module 380 may obtain, based on a combined feature and for each object, an image having a value of possibility that each pixel represents an audio corresponding to the object in a spectrogram for audio. For example, in FIG. 6, based on combined features (e.g., the first combined feature obtained by combining the first visual feature 450 and the first audio feature 540, and the second combined feature obtained by combining the second visual feature 460 and the second audio feature 550), the audio acquisition module 380 may obtain a first audio mask 631 corresponding to the first object 411 (e.g., an image having a binary value of "1" for a set of pixels representing an audio part corresponding to the first object 411 in the spectrogram 530 for audio, and having a binary value of "0" for pixels other than the set of pixels representing the audio part corresponding to the first object 411) and a second audio mask 632 (e.g., an image having a binary value of "1" for a set of pixels representing an audio part corresponding to the second object 421 in the spectrogram 530 for audio, and having a binary value of "0" for pixels other than the set of pixels representing the audio part corresponding to the second object 421). In an embodiment of the disclosure, the audio acquisition module 380 may perform an operation of correcting an error, based on a combined feature and a spectrogram corresponding to an object as a ground truth. For example, the audio acquisition module 380 may use a loss function (e.g., an l1 function, an l2 function, or a cross entropy function) to perform an operation of correcting an error so as to minimize, for each object, a pixel-specific distance (e.g., a Euclidean distance for each pixel) between a combined feature (e.g., the first combined feature obtained by combining the first visual feature 450 and the first audio feature 540, and the second combined feature obtained by combining the second visual feature 460 and the second audio feature 550) and a spectrogram of an audio corresponding to an object as a ground truth (e.g., a spectrogram of the first audio 511, and a spectrogram of the second audio 512). In an embodiment of the disclosure, the audio acquisition module 380 may indicate an l1-norm value and an l2-norm value by means of a loss function for a difference between a combined feature and a spectrogram of an audio corresponding to an object as a ground truth, the l1-norm may indicate a result of summing up the absolute values of vector components representing the difference, and the l2-norm may indicate a square root of a sum of squares of the vector components representing the difference. In an embodiment of the disclosure, after or during an operation of correcting an error, the audio acquisition module 380 may obtain the audio masks 631 and 632 for objects by using a designated activation function (e.g., a sigmoid function). For example, the audio acquisition module 380 may assign non-linear properties by using the designated activation function, and the designated activation function may include, as well as a sigmoid function, a hyperbolic tangent (Tanh) function, a rectified linear unit (ReLU) function, or a Gaussian error linear unit (GeLU) function, but the disclosure is not limited thereto.

In an embodiment of the disclosure, the audio restoration module 390 may obtain an audio part corresponding to an object in an audio of a video, based on an audio mask transferred from the audio acquisition module 380. For example, in FIG. 6, when the first audio mask 631 corresponding to the first object 411 and the second audio mask 632 corresponding to the second object 421 are obtained from the audio acquisition module 380, the audio restoration module 390 may perform an AND operation (or multiplication operation) with a spectrogram (e.g., the spectrogram 530) for audio with respect to each of the first audio mask 631 and the second audio mask 632. The audio restoration module 390 may obtain an audio part 641 corresponding to the first object 411 and an audio part 642 corresponding to the second object 421 by performing an inverse short-time Fourier transform (STFT) for a result of the AND operation (or multiplication operation).

In an embodiment of the disclosure, as a pre-processing operation before performing the above training, the processor 250 may perform, by using the segmentation module 310, an operation of obtaining, as training data, for example the first video and the second video, videos in each of which one object exists and an operation of obtaining videos (e.g., having a signal-to-noise ratio (SNR) of a designated value or greater) having a noise of a designated value or smaller.

In an embodiment of the disclosure, the processor 250 may remove a residue echo or residue noise in obtaining an audio part corresponding to the first object 411 and an audio part corresponding to the second object 421. For example, the processor may remove a residue echo or residue noise by using information on a signal-to-echo ratio (SER) difference or a signal-to-noise ratio (SNR) difference. In an embodiment of the disclosure, the above examples illustrate an operation (e.g., concatenation) of performing training by using, as input data for the segmentation module 310 and the visual feature acquisition module 320, each of the second image 420 and the first image 410 included in the first video, but the disclosure is not limited thereto. For example, as illustrated in FIG. 7, an image 710 obtained by synthesizing the second image 420 and the first image 410 included in the first video in the right and left direction (or transversely) may be used as input data for the segmentation module 310 and the visual feature acquisition module 320. As another example, an image obtained by synthesizing the first image 410 included in the first video and the second image 420 included in the second video in the up and down direction (or longitudinally) may be used as input data for the segmentation module 310 and the visual feature acquisition module 320. In an embodiment of the disclosure, when the image 710 obtained by synthesizing the first image 410 and the second image 420 in the left and right direction is used as input data, an audio 720 obtained by continuously synthesizing the first audio 511 and the second audio 512 in the left and right direction according to time, as illustrated in FIG. 7, may be used as input data in replacement of the synthesized audio 520. In this case, the processor 250 may not include the audio synthesis module 330. In an embodiment of the disclosure, when the image 710 obtained by synthesizing the second image 420 and the first image 410 included in the first video in the right and left direction (or in the up and down direction) is used as input data for the segmentation module 310 and the visual feature acquisition module 320, modules included in the processor 250 may perform operations at least partially identical or similar to the operations described above.

FIGS. 3 to 7 illustrate an example in which the processor 250 obtains information on the position of an object, and an audio part corresponding to the object with respect to one image frame in a video (or image frames (e.g., the first image 410 and the second image 420) of multiple videos during training), but the disclosure is not limited thereto. For example, the processor 250 may perform the above operations sequentially with respect to each of multiple image frames included in a video, thereby continuously obtaining information on the position of an object, and an audio part corresponding to the object with respect to each of the multiple image frames.

In an embodiment of the disclosure, at least some of operations of multiple modules included in the processor 250 may be performed by a server (e.g., the server 108).

The electronic device 101 according to various embodiments may include the memory 240, and at least one processor (e.g., the processor 250) electrically connected to the memory 240, wherein the at least one processor (e.g., the processor 250) is configured to obtain a video including an image and an audio, obtain information on at least one object included in the image from the image, obtain a visual feature of the at least one object, based on the image and the information on the at least one object, obtain a spectrogram of the audio, obtain an audio feature of the at least one object from the spectrogram of the audio, combine the visual feature and the audio feature, obtain, based on the combined visual feature and audio feature, information on a position of the at least one object, the information indicating the position of the at least one object in the image, obtain an audio part corresponding to the at least one object in the audio, based on the combined visual feature and audio feature, and store, in the memory 240, the information on the position of the at least one object and the audio part corresponding to the at least one object.

In various embodiment of the disclosure, the at least one processor (e.g., the processor 250) may be configured to, obtain, from the image, a map in which the at least one object included in the image is masked.

In various embodiments of the disclosure, the at least one processor (e.g., the processor 250) may be configured to combine the visual feature and the audio feature by performing an add operation, a multiplication operation, or a concatenation operation for the visual feature and the audio feature.

In various embodiments of the disclosure, the at least one processor (e.g., the processor 250) may be configured to obtain an image having a value of possibility that each pixel represents the at least one object, based on the combined visual feature and audio feature.

In various embodiments of the disclosure, the at least one processor (e.g., the processor 250) may be configured to obtain an image having a value of possibility that each pixel represents an audio corresponding to the at least one object, based on the combined visual feature and audio feature, and obtain an audio part corresponding to the at least one object in the audio, based on the obtained image.

In various embodiments of the disclosure, the at least one processor (e.g., the processor 250) may be configured to obtain an audio part corresponding to the at least one object in the audio, based on performing an AND operation for the spectrogram of the audio and the obtained image.

In various embodiments of the disclosure, the at least one processor (e.g., the processor 250) may be configured to perform training to generate an artificial intelligence model, and the performing of the training may include obtaining multiple videos, obtaining information (e.g., the first masking map 430 and the second masking map 440) on at least one object (e.g., the first object 411 and the second object 421) from each of images (e.g., the first image 410 and the second image 420) of the multiple videos, obtaining a visual feature (e.g., the first visual feature map 450 and the second visual feature map 460) of each of the at least one object, obtaining a spectrogram (e.g., the spectrogram 530) of an audio (e.g., the first audio 511, the second audio 512, and the synthesized audio 520) corresponding to the at least one object, obtaining an audio feature (e.g., the first audio feature 540 and the second audio feature 550) of each of the at least one object, combining the audio feature and the visual feature for each of the at least one object, obtaining, based on the combined visual feature and audio feature, information (e.g., the first localization mask 610 and the second localization mask 620) on a position of the at least one object, the information indicating the position of the at least one object in each of the images, and obtaining an audio part (e.g., the audio part 641 and the audio part 642) corresponding to the at least one object in the audio, based on the combined visual feature and audio feature.

In various embodiments of the disclosure, the at least one processor (e.g., the processor 250) may be configured to generate an artificial intelligence model related to a segmentation artificial intelligence network, based on images of the multiple videos, and an image part of the at least one object in each of the images as a ground truth.

In various embodiments of the disclosure, the obtaining of the information on the position of the at least one object may further include correcting an error such that a distance between the audio feature and the visual feature is minimized by using a loss function based on metric learning.

In various embodiments of the disclosure, the obtaining of the audio part corresponding to the at least one object in the audio may further include correcting an error such that by using a loss function and for each of the at least one object, a pixel-specific distance between a feature obtained by combining the visual feature and the audio feature, and the spectrogram of the audio corresponding to the at least one object is minimized.

Figure 8:
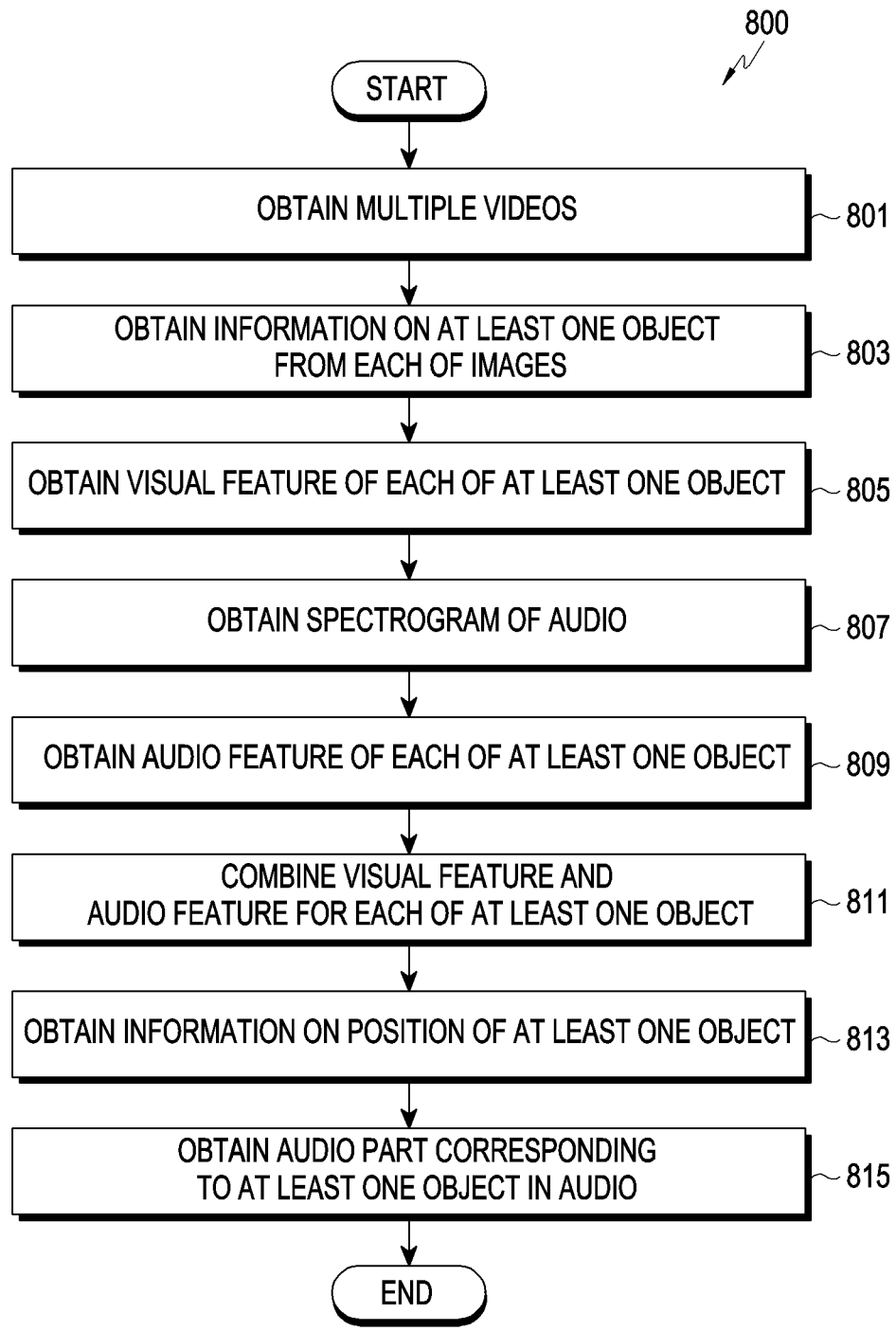
FIG. 8 is a flowchart illustrating a training process for performing a method for providing a video according to an embodiment of the disclosure.

FIG. 8 is a flowchart 800 illustrating a training process for performing a method for providing a video according to an embodiment of the disclosure.

Referring to FIG. 8, in operation 801, in an embodiment of the disclosure, the processor 250 may obtain multiple videos. For example, the processor 250 may obtain multiple videos each including an image and an audio.

In an embodiment of the disclosure, the processor 250 may perform an operation of obtaining, as training data, videos in each of which one object exists, and an operation of obtaining multiple videos (e.g., having a signal-to-noise ratio (SNR) of a designated value or greater) having a noise of a designated value or smaller.

In operation 803, in an embodiment of the disclosure, the processor 250 may obtain information on at least one object from each of images of the multiple videos.

In an embodiment of the disclosure, the processor 250 may obtain a map (e.g., a binary map in which at a pixel value indicating at least one object included in an image is "1", and a pixel value of a part remaining after excluding the at least one object from the image is "0") in which at least one object included in each of the images is masked.

In an embodiment of the disclosure, the processor 250 may generate an artificial intelligence model (e.g., a parameter of a segmentation artificial intelligence network) related to a segmentation artificial intelligence network by using multiple images (e.g., the first image 410 and the second image 420) obtained from multiple videos (e.g., the first video and the second video), and a ground truth (or annotation) (e.g., an image part of the at least one object in each of the images of the multiple videos).

In an embodiment of the disclosure, when multiple images (the first image 410 and the second image 420) are input, the processor 250 may obtain object-specific masking maps (e.g., the first masking map 430 including the mask 431 for the first object 411, and the second masking map 440 including the mask 441 for the second object 421).

In operation 805, in an embodiment of the disclosure, the processor 250 may obtain a visual feature of each of the at least one object.

In an embodiment of the disclosure, the processor 250 may obtain a visual feature of at least one object (e.g., the first object 411 and the second object 421), based on multiple images (the first image 410 and the second image 420), and information (e.g., the first masking map 430 and the second masking map 440) on the at least one object. For example, the processor 250 may obtain a visual feature (e.g., the first visual feature map 450 and the second visual feature map 460) corresponding to at least one object (e.g., the first object 411 and the second object 421), based on multiple images (the first image 410 and the second image 420), and information (e.g., the first masking map 430 and the second masking map 440) on the at least one object.

In operation 807, in an embodiment of the disclosure, the processor 250 may obtain a spectrogram of an audio corresponding to the at least one object.

In an embodiment of the disclosure, the processor 250 may synthesize multiple audios obtained from the multiple videos, respectively. In an embodiment of the disclosure, as illustrated in FIGS. 4 and 5, the processor 250 may obtain the first audio 511 to be output for a time interval of the first image 410 in the first video, and the second audio 512 to be output for a time interval of the second image 420 in the second video. For example, when the frame per second (FPS) of the first video and the second video is 24 FPS, a time interval of the first audio 511 to be output together with each of the first image 410 in the first video, and a time interval of the second audio 512 to be output together with the second image 420 in the second video may be ¹⁄₂₄ (seconds). The processor 250 may synthesize the first audio 511 and the second audio 512 to obtain the synthesized audio 520. The processor 250 may sum up a size of the first audio 511 and a size of the second audio 512 according to time, and obtain the synthesized audio 520 as a result of the summing.

In an embodiment of the disclosure, the processor 250 may apply a synthesized audio (e.g., the synthesized audio 520) to a short-time Fourier transform (STFT) so as to obtain a spectrogram (e.g., the spectrogram 530) visually representing a size (e.g., the amplitude of the audio) of the audio according to each time and frequency with respect to the audio.

In operation 809, in an embodiment of the disclosure, the processor 250 may obtain an audio feature of each of the at least one object.

In an embodiment of the disclosure, the processor 250 may obtain an audio feature (e.g., the first audio feature 540 of the first object 411 and the second audio feature 550 of the second object 421) corresponding to each of at least one object, based on a spectrogram (e.g., the spectrogram 530) of a synthesized audio (e.g., the synthesized audio 520).

FIG. 8 illustrates an example in which operation 803 and operation 805 are performed before operation 807 and operation 809, but the disclosure is not limited thereto. For example, operation 803 and operation 805 may be performed after operation 807 and operation 809, or in parallel to operation 807 and operation 809.

In operation 811, in an embodiment of the disclosure, the processor 250 may combine the visual feature and the audio feature for each of the at least one object.

In an embodiment of the disclosure, the processor 250 may perform an add operation, a multiplication operation (e.g., matrix multiplication operation), or a concatenation operation for the visual feature and the audio feature for each of at least one object, thereby combining the visual feature and the audio feature.

In operation 813, in an embodiment of the disclosure, the processor 250 may obtain information on the position of the at least one object, which indicates the position of the at least one object in an image, based on the combined visual feature and audio feature.

In an embodiment of the disclosure, the processor 250 may obtain, for each of the at least one object, an image (also called "a segmentation map" or an object localization mask") having a value (or a value obtained by converting, into a binary value (e.g., "0" or "1"), a value of possibility that each pixel represents the object) of possibility that each pixel represents the object. For example, based on combined features (e.g., the first combined feature obtained by combining the first visual feature 450 and the first audio feature 540, and the second combined feature obtained by combining the second visual feature 460 and the second audio feature 550), the processor 250 may obtain the first object localization mask 610 for the first object 411 (e.g., an image having a binary value of "1" for the set 611 of pixels representing the first object 411, and having a binary value of "0" for pixels other than the set 611 of pixels representing the first object 411) and the second object localization mask 620 for the second object 421 (e.g., an image having a binary value of "1" for the set 621 of pixels representing the second object 421, and having a binary value of "0" for pixels other than the set 621 of pixels representing the second object 421).

In an embodiment of the disclosure, the processor 250 may perform an operation of correcting an error, based on a distance (e.g., a Euclidean distance) between a visual feature and an audio feature. In an embodiment of the disclosure, the processor 250 may perform an operation of correcting an error so as to minimize a distance between a visual feature and an audio feature of each object by using a metric learning-based loss function (e.g., a contrastive loss function). For example, the processor 250 may use a contrastive loss function to perform an operation of correcting an error so that a distance between the first visual feature 450 and the first audio feature 540 of the first object 411 is minimized, and a distance between the second visual feature 460 and the second audio feature 550 of the second object 421 is minimized. In an embodiment of the disclosure, after or during an operation of correcting an error, the processor 250 may obtain, for each object, an image having a value of possibility that each pixel represents the object, by using a designated activation function (e.g., a softmax function). In an embodiment of the disclosure, the processor 250 may perform operations described above for training, and then further perform an operation of correcting an error by using information (e.g., a map in which an object included in an image is masked) on an object transferred from the segmentation module 310.

In operation 815, in an embodiment of the disclosure, the processor 250 may obtain an audio part corresponding to the at least one object in an audio, based on the combined visual feature and audio feature.

In an embodiment of the disclosure, the processor 250 may obtain, based on the combined visual feature and audio feature and for each object, an image (also called an "audio mask" or a "spectrogram binary map") having a value (or a value obtained by converting, into a binary value (e.g., "0" or "1"), a value of possibility that each pixel represents an audio corresponding to the object) of possibility that each pixel of a spectrogram for audio represents an audio corresponding to the object. For example, based on combined features (e.g., the first combined feature obtained by combining the first visual feature 450 and the first audio feature 540, and the second combined feature obtained by combining the second visual feature 460 and the second audio feature 550), the processor 250 may obtain the first audio mask 631 corresponding to the first object 411 (e.g., an image having a binary value of "1" for a set of pixels representing an audio part corresponding to the first object 411 in the spectrogram 530 for audio, and having a binary value of "0" for pixels other than the set of pixels representing the audio part corresponding to the first object 411) and the second audio mask 632 (e.g., an image having a binary value of "1" for a set of pixels representing an audio part corresponding to the second object 421 in the spectrogram 530 for audio, and having a binary value of "0" for pixels other than the set of pixels representing the audio part corresponding to the second object 421). The processor 250 may perform an operation of correcting an error, based on a combined feature and a spectrogram corresponding to an object as a ground truth. For example, the processor 250 may use a loss function (e.g., an l1 function, an l2 function, or a cross entropy function) to perform an operation of correcting an error so as to minimize, for each object, a pixel-specific distance (e.g., a Euclidean distance for each pixel) between a combined feature (e.g., the first combined feature obtained by combining the first visual feature 450 and the first audio feature 540, and the second combined feature obtained by combining the second visual feature 460 and the second audio feature 550) and a spectrogram of an audio corresponding to an object as a ground truth (e.g., a spectrogram of the first audio 511, and a spectrogram of the second audio 512). In an embodiment of the disclosure, after or during an operation of correcting an error, the processor 250 may obtain the audio masks 631 and 632 for objects by using a designated activation function (e.g., a sigmoid function).

In an embodiment of the disclosure, the processor 250 may obtain an audio part corresponding to an object in an audio of a video, based on an audio mask (e.g., the audio masks 631 and 632). For example, when the first audio mask 631 corresponding to the first object 411 and the second audio mask 632 corresponding to the second object 421 are obtained, the processor 250 may perform an AND operation (or multiplication operation) with a spectrogram (e.g., the spectrogram 530) for audio with respect to each of the first audio mask 631 and the second audio mask 632. The processor 250 may obtain the audio part 641 corresponding to the first object 411 and an audio part 642 corresponding to the second object 421 by performing an inverse short-time Fourier transform (STFT) for a result of the AND operation (or multiplication operation).

Figure 9:
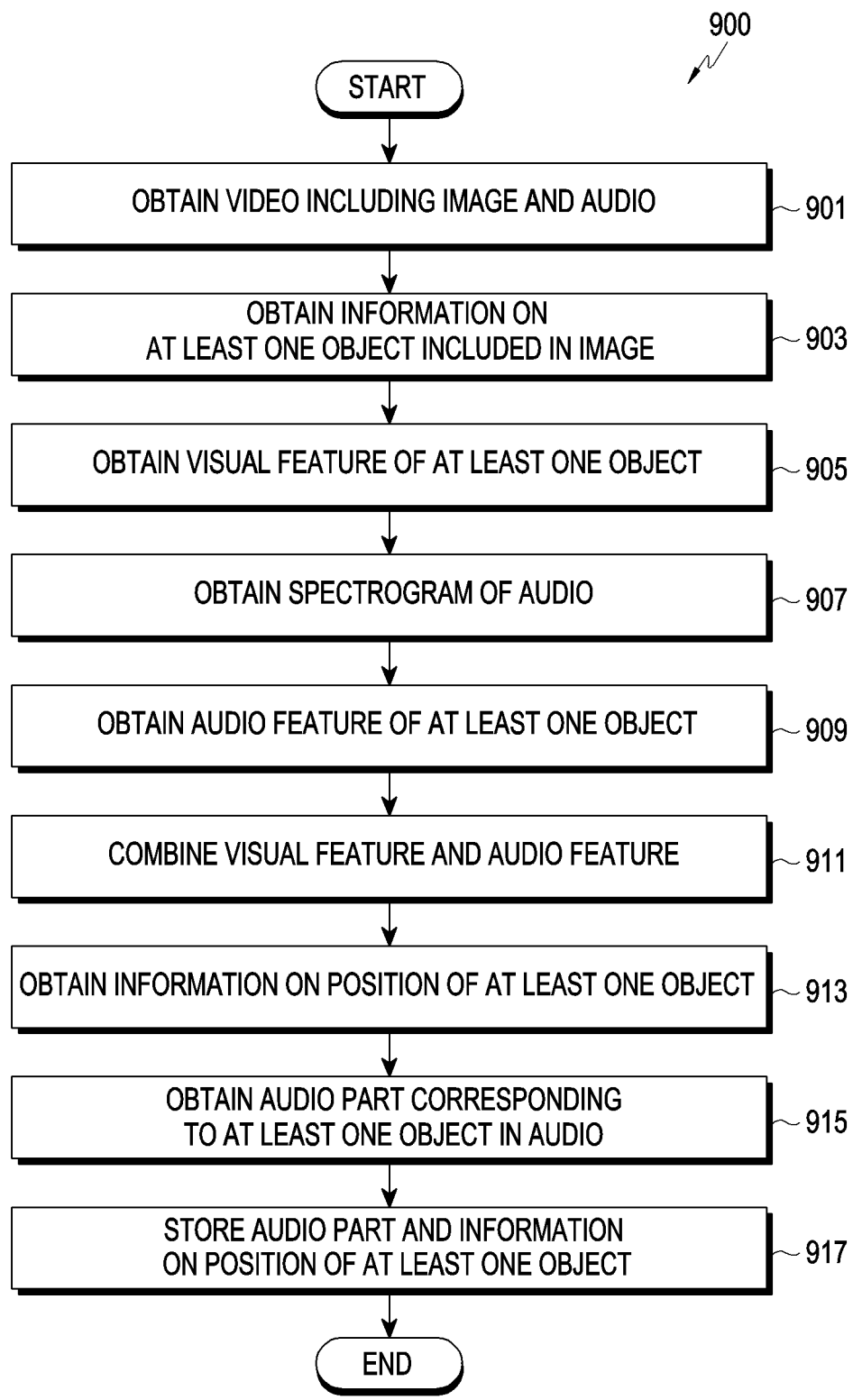
FIG. 9 is a flowchart illustrating a method for providing a video according to an embodiment of the disclosure.

FIG. 9 is a flowchart 900 illustrating a method for providing a video according to an embodiment of the disclosure.

Referring to FIG. 9, in operation 901, in an embodiment of the disclosure, the processor 250 may obtain a video including an image and an audio. For example, the processor 250 may obtain a video from the memory 240 (e.g., a gallery application) or an external electronic device (e.g., the electronic device 102, the electronic device 104, or the server 108). As another example, the processor 250 may obtain a video (e.g., a preview video) from the camera module 235.

In operation 903, in an embodiment of the disclosure, the processor 250 may obtain information on at least one object included in an image of the video.

In an embodiment of the disclosure, the processor 250 may obtain a map (e.g., a binary map in which at a pixel value indicating at least one object included in an image is "1", and a pixel value of a part remaining after excluding the at least one object from the image is "0") in which at least one object included in an image of the video is masked. For example, the processor 250 may obtain a map in which at least one object included in an image of the video is masked, by using a segmentation artificial intelligence network.

In an embodiment of the disclosure, the processor 250 may obtain, for each of at least one object included in an image of the video, information on the object. For example, the processor 250 may obtain one or more masking maps corresponding to one or more objects included in an image of the video, respectively.

In operation 905, in an embodiment of the disclosure, the processor 250 may obtain a visual feature of the at least one object. For example, the processor 250 may obtain, based on the image of the video and the information on the at least one object, a visual feature of each of the at least one object.

In operation 907, in an embodiment of the disclosure, the processor 250 may obtain an audio spectrogram of an audio for the at least one object.

In an embodiment of the disclosure, the processor 250 may obtain an audio to be output for a time interval of the image in the video. The processor 250 may apply the obtained audio to a short-time Fourier transform (STFT) so as to obtain a spectrogram visually representing a size (e.g., the amplitude of the audio) of the audio according to each time and frequency with respect to the audio.

In operation 909, in an embodiment of the disclosure, the processor 250 may obtain an audio feature of the at least one object. For example, the processor 250 may obtain, for each of the at least one object and based on the spectrogram of the audio for the at least one object, at least one audio feature corresponding to each of the at least one object.

FIG. 9 illustrates an example in which operation 903 and operation 905 are performed before operation 907 and operation 909, but the disclosure is not limited thereto. For example, operation 903 and operation 905 may be performed after operation 907 and operation 909, or in parallel to operation 907 and operation 909.

In operation 911, in an embodiment of the disclosure, the processor 250 may combine the visual feature and the audio feature for each of the at least one object.

In an embodiment of the disclosure, the processor 250 may perform an add operation, a multiplication operation (e.g., matrix multiplication operation), or a concatenation operation for the visual feature and the audio feature for each of at least one object, thereby combining the visual feature and the audio feature.

In operation 913, in an embodiment of the disclosure, the processor 250 may obtain information on the position of the at least one object, which indicates the position of the at least one object in the image, based on the combined visual feature and audio feature.

In an embodiment of the disclosure, the processor 250 may obtain, for each of the at least one object, an image having a value (or a value obtained by converting, into a binary value (e.g., "0" or "1"), a value of possibility that each pixel represents the object) of possibility that each pixel represents the object.

In operation 915, in an embodiment of the disclosure, the processor 250 may obtain an audio part corresponding to the at least one object in the audio, based on the combined visual feature and audio feature.

In an embodiment of the disclosure, the processor 250 may obtain, based on the combined visual feature and audio feature and for each object, an image (e.g., an audio mask) having a value (or a value obtained by converting, into a binary value (e.g., "0" or "1"), a value of possibility that each pixel represents an audio corresponding to the object) of possibility that each pixel represents an audio corresponding to the object in the spectrogram for audio.

In an embodiment of the disclosure, the processor 250 may obtain an audio part corresponding to the object in the audio of the video, based on an audio mask. For example, when an audio mask corresponding to the at least one object is obtained, the processor 250 may perform an AND operation (e.g., a multiplication operation) with the spectrogram (e.g., the spectrogram 530) for the audio with respect to the obtained audio mask. The processor 250 may obtain at least one audio part corresponding to the at least one object by performing an inverse short-time Fourier transform (STFT) for a result of the AND operation (or multiplication operation).

In operation 917, in an embodiment of the disclosure, the processor 250 may store, in the memory 240, the information on the position of the at least one object, and the audio part. For example, the processor 250 may associate (e.g., map) the information on the position of the at least one object obtained in operation 913, with the audio part corresponding to the at least one object obtained in operation 915, and store same in the memory 240.

Figure 10:
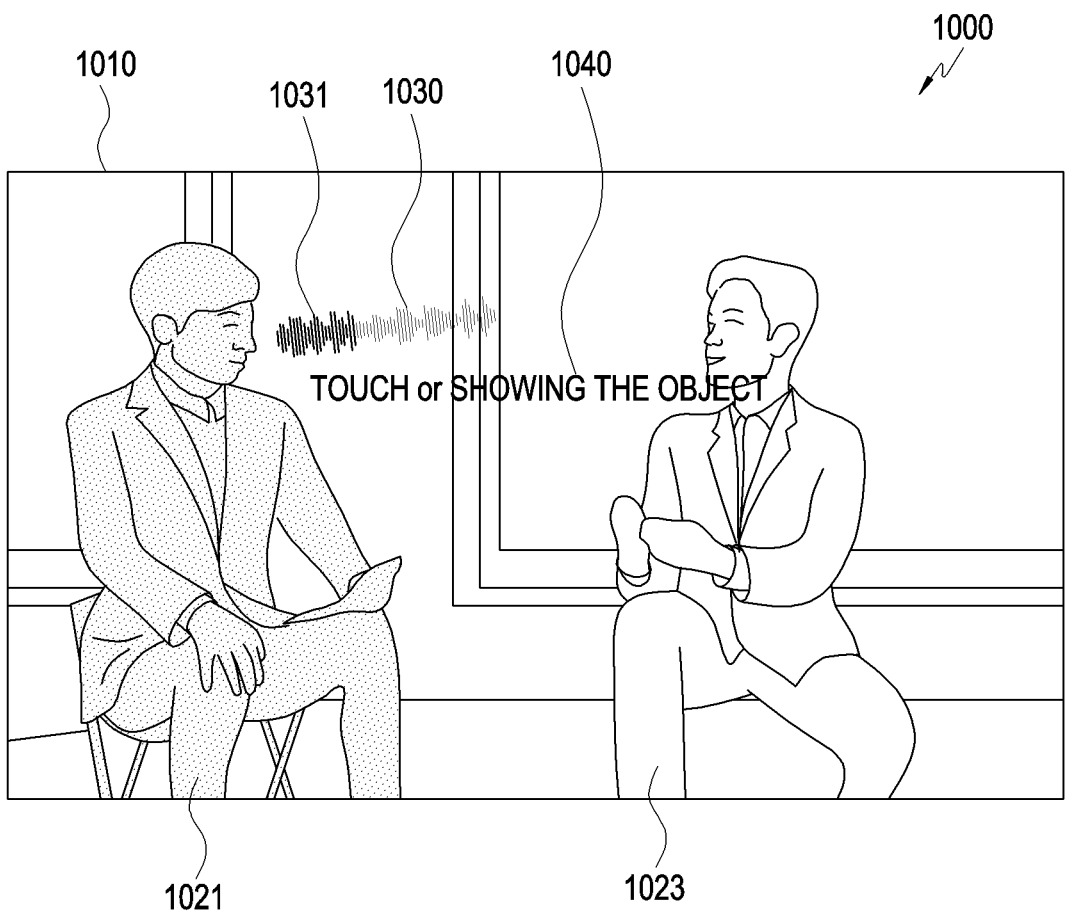
FIG. 10 is a diagram illustrating a method for providing a video according to an embodiment of the disclosure.

FIG. 10 is a diagram 1000 illustrating a method for providing a video according to an embodiment of the disclosure.

Referring to FIG. 10, in an embodiment of the disclosure, while outputting a video, the processor 250 may output an audio and/or information indicating the position of an object. In an embodiment of the disclosure, while a video is output, the processor 250 may output information indicating the position of an object corresponding to an audio. For example, in FIG. 10, while an image 1010 of a video is displayed via the display 220, the processor 250 may output an audio corresponding to a first object 1021 via the sound output module 230. The processor 250 may change a display (e.g., color) of the first object 1021 in order to indicate that the first object 1021 is an object corresponding to the output audio. For example, in order to indicate that the first object 1021 is an object corresponding to the output audio, the processor 250 may display the first object 1021 to be opaque via the display 220, and may not change a display of a second object 1023 unrelated to the output audio.

In an embodiment of the disclosure, the processor 250 may output an audio corresponding to an object selected by a user in a video via the sound output module 230 such that a size of the audio corresponding to the object selected by the user is larger than a size of an audio corresponding to another object. For example, the processor 250 may output an audio corresponding to the first object 1021 selected by a user in the image 101 of the video via the sound output module 230 such that a size of the audio corresponding to the first object 1021 is larger than a size of an audio corresponding to the second object 1023. However, the disclosure is not limited thereto, and when an audio corresponding to an object selected by a user in a video, and an audio corresponding to another object are simultaneously output, the processor 250 may output only the audio corresponding to the object selected by the user via the sound output module 230, and may not output the audio corresponding to said another object via a sound output module.

In an embodiment of the disclosure, while a video is output, the processor 250 may configure, based on a user input, that information indicating the position of an object corresponding to an output audio is displayed via the display 220. In an embodiment of the disclosure, while a video is output, the processor 250 may change a display of an object selected by a user. While an audio corresponding to the selected object is output, the processor 250 may change a display of the selected object in order to indicate that the audio corresponding to the selected object is output.

In an embodiment of the disclosure, the processor 250 may display, via the display 220, information related to an audio of an object selected by a user in an image of a video. For example, the processor 250 may display, via the display 220 and in information 1030 indicating a volume and a time interval of the entire audio of the video, information 1031 indicating a volume and a time interval of an audio of the first object 1021 selected by a user in the image 1010 of the video.

In an embodiment of the disclosure, while outputting the video, the processor 250 may display, via the display 220, information 1040 indicating a function of outputting an audio and/or information indicating the position of an object.

In an embodiment, the processor 250 may determine an object included in a video, and provide information distinguished for each determined object. For example, the processor 250 may provide different displays (e.g., effect, color, or highlight) of the first object 1021 and the second object 1023 recognized in the image 1010 of the video, and display information indicating an audio volume and a time interval to be different for the first object 1021 and the second object 1023 among the information 1030 indicating a volume and a time interval of the entire audio of the video. For example, the processor may display, via the display 220, the first object 1021 to be blue, and the second object 1023 to be red. In addition, the processor may display an audio volume and time interval of the first object 1021 to be blue, and an audio volume and time interval of the second object 1023 to be red among the information 1030 indicating a volume and a time interval of the entire audio of the video.

In an embodiment of the disclosure, the processor may output an audio corresponding to a time interval selected by a user input among the information 1030 indicating a volume and a time interval of the entire audio of the video. For example, the processor 250 may distinguishably display, based on the first object 1021 and the second object 1023 included in the video, the information 1030 indicating a volume and a time interval of the entire audio of the video, and output, via the sound output module 230, an audio of a time interval (e.g., the time interval of the first object 1021 and the time interval of the second object 1023) selected by a user input among the information 1030. For example, while the audio of the first object 1021 is output, when a user input to the time interval of the second object 1023 is obtained, the processor 250 may change a display (e.g., effect, color, or highlight) of the second object 1023 to be different, and output the audio of the second object 1023. In addition, a display of the first object 1021 may be changed to be in a type of the original video, and the audio of the first object 1021 may not be output, or the size thereof may become smaller.

Figure 11:
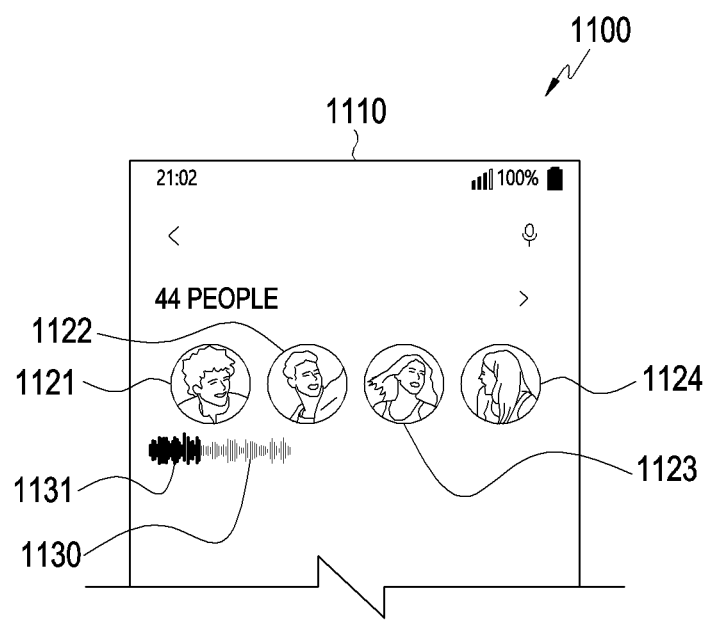
FIG. 11 is a diagram illustrating a method for providing a video according to an embodiment of the disclosure.

FIG. 11 is a diagram 1100 illustrating a method for providing a video according to an embodiment of the disclosure.

Referring to FIG. 11, in an embodiment of the disclosure, the processor 250 may display, via the display 220, an image (e.g., images 1121, 1122, 1123, and 1124) of a video including an object (e.g., an object related to a person) in an execution screen 1110 of a gallery application. When an image of the video is selected, the processor 250 may display information 1131 indicating a volume and a time interval of an audio of an object of the selected image in information 1130 indicating a volume and a time interval of the entire audio of the video of the selected image via the display 220 in an area adjacent to the selected image in the video of the selected image. For example, when the image 1121 is selected among the images 1121, 1122, 1123, and 1124 of videos, the processor 250 may display information 1131 indicating a volume and a time interval of an audio of an object of the selected image 1121 in information 1130 indicating a volume and a time interval of the entire audio of the video via the display 220 in an area adjacent to the selected image 1121 in the video of the selected image 1121.

In an embodiment of the disclosure, when images are determined to include the same object or are configured by a user to include the same object among an image (e.g., the images 1121, 1122, 1123, and 1124) of a video including an object (e.g., an object related to a person), the processor 250 may group the images as one object and display the grouped images (not illustrated). For example, when the image 1123 and the image 1124 are determined or selected to include the same object, the processor 250 may display an image obtained by grouping the image 1123 and the image 1124, and display a volume and a time interval of an audio of the object corresponding to the image 1123 and the image 1124 in the information 1130 indicating a volume and a time interval of the entire audio of the video together. For example, a time interval corresponding to the image 1123 and a time interval corresponding to the image 1124 may be displayed to be distinguished in the information 1130 indicating a volume and a time interval of the entire audio of the video.

A method for providing a video by the electronic device 101 according to various embodiments may include obtaining a video including an image and an audio, obtaining information on at least one object included in the image from the image, obtaining a visual feature of the at least one object, based on the image and the information on the at least one object, obtaining a spectrogram of the audio, obtaining an audio feature of the at least one object from the spectrogram of the audio, combining the visual feature and the audio feature, obtaining, based on the combined visual feature and audio feature, information on a position of the at least one object, the information indicating the position of the at least one object in the image, obtaining an audio part corresponding to the at least one object in the audio, based on the combined visual feature and audio feature, and storing, in the memory 240 of the electronic device 101, the information on the position of the at least one object and the audio part corresponding to the at least one object.

In various embodiments of the disclosure, the obtaining of the information on the at least one object may include obtaining, from the image, a map in which the at least one object included in the image is masked.

In various embodiments of the disclosure, the combining of the visual feature and the audio feature may include combining the visual feature and the audio feature by performing an add operation, a multiplication operation, or a concatenation operation for the visual feature and the audio feature.

In various embodiments of the disclosure, the obtaining of the information on the position of the at least one object may include obtaining an image having a value of possibility that each pixel represents the at least one object, based on the combined visual feature and audio feature.

In various embodiments of the disclosure, the obtaining of the audio part corresponding to the at least one object may include obtaining an image having a value of possibility that each pixel represents an audio corresponding to the at least one object, based on the combined visual feature and audio feature, and obtaining an audio part corresponding to the at least one object in the audio, based on the obtained image.

In various embodiments of the disclosure, the obtaining of the audio part corresponding to the at least one object in the audio may include obtaining an audio part corresponding to the at least one object in the audio, based on performing an AND operation for the spectrogram of the audio and the obtained image.

In various embodiments of the disclosure, the method may further include performing training to generate an artificial intelligence model, and the performing of the training may include obtaining multiple videos, obtaining information on at least one object (e.g., the first object 411 and the second object 421) from each of images (e.g., the first image 410 and the second image 420) of the multiple videos, obtaining a visual feature (e.g., the first visual feature map 450 and the second visual feature map 460) of each of the at least one object, obtaining a spectrogram (e.g., the spectrogram 530) of an audio (e.g., the first audio 511, the second audio 512, and the synthesized audio 520) corresponding to the at least one object, obtaining an audio feature of each of the at least one object, combining the audio feature and the visual feature for each of the at least one object, obtaining, based on the combined visual feature and audio feature, information (e.g., the first localization mask 610 and the second localization mask 620) on a position of the at least one object, the information indicating the position of the at least one object in each of the images, and obtaining an audio part (e.g., the audio part 641 and the audio part 642) corresponding to the at least one object in the audio, based on the combined visual feature and audio feature.

In various embodiments of the disclosure, the obtaining of the information on the at least one object may include generating an artificial intelligence model related to a segmentation artificial intelligence network, based on images of the multiple videos, and an image part of the at least one object in each of the images as a ground truth.

In various embodiments of the disclosure, the obtaining of the information on the position of the at least one object may further include correcting an error such that a distance between the audio feature and the visual feature by using a loss function based on metric learning is minimized.

In various embodiments of the disclosure, the obtaining of the audio part corresponding to the at least one object in the audio may further include correcting an error such that by using a loss function and for each of the at least one object, a pixel-specific distance between a feature obtained by combining the visual feature and the audio feature, and the spectrogram of the audio corresponding to the at least one object is minimized.

In addition, a data structure used in an embodiment disclosed herein may be recorded on a computer-readable recording medium through various means. The computer-readable recording medium may include a storage medium, such as a magnetic storage medium (e.g., a ROM, a floppy disk, or a hard disk) or an optical reading medium (e.g., a CD-ROM or a digital video disc (DVD)).

What is claimed is:

1. An electronic device comprising:
at least one processor including processing circuitry; and
memory storing instructions that, when executed by the at least one processor individually or collectively, cause the electronic device to:
obtain a video including an image and an audio,
obtain information on at least one object included in the image from the image, the information on the at least one object including a map in which the at least one object included in the image is masked,
obtain a visual feature of the at least one object, based on the image and the information on the at least one object,
obtain a spectrogram of the audio,
obtain an audio feature of the at least one object from the spectrogram of the audio,
combine the visual feature and the audio feature,
obtain, based on the combined visual feature and audio feature, information on a position of the at least one object, the information indicating the position of the at least one object in the image, by obtaining a mask having a value of possibility that each pixel represents the at least one object, based on the combined visual feature and audio feature,
obtain an audio part corresponding to the at least one object in the audio, based on the combined visual feature and audio feature,
store, in the memory, the information on the position of the at least one object and the audio part corresponding to the at least one object, display the video, and while displaying the video, displaying an audio volume indicator and a time interval indicator for the audio part, the time interval indicator having a first portion displayed having a first visual attribute and a remaining portion of the time interval indicator displayed having a second visual attribute, the first visual attribute being a same as a visual attribute of the at least one object while the audio part corresponding to the at least one object is output, wherein the first visual attribute is different from the second visual attribute.

2. The electronic device of claim 1, wherein the instructions that, when executed by the at least one processor individually or collectively, cause the electronic device to combine the visual feature and the audio feature by performing an add operation, a multiplication operation, or a concatenation operation for the visual feature and the audio feature.

3. The electronic device of claim 1, wherein the instructions that, when executed by the at least one processor individually or collectively, cause the electronic device to:

obtain an image having a value of possibility that each pixel represents an audio corresponding to the at least one object, based on the combined visual feature and audio feature, and obtain an audio part corresponding to the at least one object in the audio, based on the obtained image.

4. The electronic device of claim 3, wherein the instructions that, when executed by the at least one processor individually or collectively, cause the electronic device to obtain an audio part corresponding to the at least one object in the audio, based on performing an AND operation for the spectrogram of the audio and the obtained image.

5. The electronic device of claim 1, wherein the instructions that, when executed by the at least one processor individually or collectively, further cause the electronic device to perform training to generate an artificial intelligence model, and wherein, to perform the training, the instructions that, when executed by the at least one processor individually or collectively, cause the electronic device to:

obtain multiple videos, obtain information on at least one object from each of images of the multiple videos, obtain a visual feature of each of the at least one object, obtain a spectrogram of an audio corresponding to the at least one object, obtain an audio feature of each of the at least one object, combine the audio feature and the visual feature for each of the at least one object, obtain, based on the combined visual feature and audio feature, information on a position of the at least one object, the information indicating the position of the at least one object in each of the images, and obtain an audio part corresponding to the at least one object in the audio, based on the combined visual feature and audio feature.

6. The electronic device of claim 5, wherein the instructions that, when executed by the at least one processor individually or collectively, cause the electronic device to generate an artificial intelligence model related to a segmentation artificial intelligence network, based on images of the multiple videos, and an image part of the at least one object in each of the images as a ground truth.

7. The electronic device of claim 5, wherein, to obtain the information on the position of the at least one object, the instructions that, when executed by the at least one processor individually or collectively, further cause the electronic device to correct an error such that a distance between the audio feature and the visual feature is minimized by using a loss function based on metric learning.

8. The electronic device of claim 5, wherein, to obtain the audio part corresponding to the at least one object in the audio, the instructions that, when executed by the at least one processor individually or collectively, further cause the electronic device to correct an error such that by using a loss function and for each of the at least one object, a pixel-specific distance between a feature obtained by combining the visual feature and the audio feature, and the spectrogram of the audio corresponding to the at least one object is minimized.

9. A method for providing a video by an electronic device, the method comprising:

obtaining a video including an image and an audio;

obtaining information on at least one object included in the image from the image, the information on the at least one object including a map in which the at least one object included in the image is masked;

obtaining a visual feature of the at least one object, based on the image and the information on the at least one object;

obtaining a spectrogram of the audio;

obtaining an audio feature of the at least one object from the spectrogram of the audio;

combining the visual feature and the audio feature;

obtaining, based on the combined visual feature and audio feature, information on a position of the at least one object, the information indicating the position of the at least one object in the image, by obtaining a mask having a value of possibility that each pixel represents the at least one object, based on the combined visual feature and audio feature;

obtaining an audio part corresponding to the at least one object in the audio, based on the combined visual feature and audio feature;

storing, in a memory of the electronic device, the information on the position of the at least one object and the audio part corresponding to the at least one object, display the video; and while displaying the video, displaying an audio volume indicator and a time interval indicator for the audio part, the time interval indicator having a first portion displayed having a first visual attribute and a remaining portion of the time interval indicator is displayed having a second visual attribute, the first visual attribute being a same as a visual attribute of the at least one object while the audio part corresponding to the at least one object is output, wherein the first visual attribute is different from the second visual attribute.

10. The method of claim 9, wherein the combining of the visual feature and the audio feature comprises combining the visual feature and the audio feature by performing an add operation, a multiplication operation, or a concatenation operation for the visual feature and the audio feature.

11. The method of claim 10, wherein the obtaining of the audio part corresponding to the at least one object comprises:

obtaining an image having a value of possibility that each pixel represents an audio corresponding to the at least one object, based on the combined visual feature and audio feature; and obtaining an audio part corresponding to the at least one object in the audio, based on the obtained image.

12. The method of claim 11, wherein the obtaining of the audio part corresponding to the at least one object in the audio comprises obtaining an audio part corresponding to the at least one object in the audio, based on performing an AND operation for the spectrogram of the audio and the obtained image.

13. The method of claim 9, further comprising:
performing training to generate an artificial intelligence model,
wherein the performing of the training comprises:
   obtaining multiple videos;
   obtaining information on at least one object from each of images of the multiple videos;
   obtaining a visual feature of each of the at least one object;
   obtaining a spectrogram of an audio corresponding to the at least one object;
   obtaining an audio feature of each of the at least one object;
   combining the audio feature and the visual feature for each of the at least one object;
   obtaining, based on the combined visual feature and audio feature, information on a position of the at least one object, the information indicating the position of the at least one object in each of the images; and
   obtaining an audio part corresponding to the at least one object in the audio, based on the combined visual feature and audio feature.

14. The method of claim 13, wherein the obtaining of the information on the at least one object comprises generating an artificial intelligence model related to a segmentation artificial intelligence network, based on images of the multiple videos, and an image part of the at least one object in each of the images as a ground truth.

15. The method of claim 13, wherein the obtaining of the information on the position of the at least one object further comprises correcting an error such that a distance between the audio feature and the visual feature is minimized by using a loss function based on metric learning.

16. The method of claim 9, wherein the obtaining of the audio part corresponding to the at least one object in the audio further comprises correcting an error such that by using a loss function and for each of the at least one object, a pixel-specific distance between a feature obtained by combining the visual feature and the audio feature, and the spectrogram of the audio corresponding to the at least one object is minimized.

17. The method of claim 9, further comprising:
while displaying the video, displaying a second object, the time interval indicator having a third portion displayed having a third visual attribute, the second object being displayed having the third visual attribute.

18. The method of claim 9, wherein the first visual attribute comprises at least one of an effect, a color, or a highlight.

* * * * *